(12) United States Patent
Naito

(10) Patent No.: US 8,540,385 B2
(45) Date of Patent: Sep. 24, 2013

(54) BACKLIGHT ASSEMBLY, RELAY CONNECTOR, AND BACKLIGHT UNIT

(75) Inventor: Takeharu Naito, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 13/583,751

(22) PCT Filed: Mar. 31, 2011

(86) PCT No.: PCT/JP2011/058199
§ 371 (c)(1),
(2), (4) Date: Sep. 10, 2012

(87) PCT Pub. No.: WO2011/125830
PCT Pub. Date: Oct. 13, 2011

(65) Prior Publication Data
US 2013/0016498 A1    Jan. 17, 2013

(30) Foreign Application Priority Data

Apr. 5, 2010 (JP) .................. 2010-087119
Jun. 23, 2010 (JP) .................. 2010-142942

(51) Int. Cl.
*G09F 13/04* (2006.01)
(52) U.S. Cl.
USPC ........... 362/97.1; 362/607; 362/608; 362/611
(58) Field of Classification Search
CPC ...... G09F 13/04; G02F 1/13452; H05K 13/74
USPC ............... 362/97.1, 217.17, 607–608, 611, 362/634; 349/61; 29/226, 65
See application file for complete search history.

(56) References Cited

U.S. PATENT DOCUMENTS

| 2009/0302780 A1 | 12/2009 | Kim et al. |
| 2010/0039579 A1 | 2/2010 | Park et al. |
| 2010/0097541 A1 | 4/2010 | Tomiyoshi |

FOREIGN PATENT DOCUMENTS

| JP | 2009-146862 | 7/2009 |
| JP | 2009-295587 | 7/2009 |
| JP | 2010-045017 | 2/2010 |
| WO | WO 2008/108039 | 9/2008 |

OTHER PUBLICATIONS

International Search Report of PCT/JP2011/058199, date of mailing Jul. 5, 2011.

*Primary Examiner* — Tracie Y Green
(74) *Attorney, Agent, or Firm* — Collard & Roe, P.C.

(57) ABSTRACT

Provided is a backlight assembly wherein a cost reduction is easier than conventional. A backlight assembly (1) has light-emitting element boards (23*a* to 23*f*) that are mounted with light-emitting elements (31) and provided on a frame (3*b*) around an upper surface (front surface) of a chassis (3), a power supply board (51) that is provided on a back surface of the chassis (3) and supplies power to the light-emitting element boards (23*a* to 23*f*), and a relay connector (21) that is held by the chassis (3) and electrically connects between the power supply board (51) and the light-emitting element boards (23*a* to 23*f*).

13 Claims, 30 Drawing Sheets

BACKLIGHT ASSEMBLY, RELAY CONNECTOR, AND BACKLIGHT UNIT

CROSS REFERENCE TO RELATED APPLICATIONS

This application is the National Stage of PCT/JP2011/058199 filed on Mar. 31, 2011, which claims priority under 35 U.S.C. §119 of Japanese Application No. 2010-087119 filed on Apr. 5, 2010, and Japanese Application No. 2010-142942 filed on Jun. 23, 2010, the disclosures of which are incorporated by reference. The international application under PCT article 21(2) was not published in English.

TECHNICAL FIELD

This invention relates to a backlight assembly, to a relay connector for use in the backlight assembly, and to a backlight unit comprising the backlight assembly.

BACKGROUND ART

A display device using liquid crystals is light and thin with low power consumption as compared with a display device such as a Braun tube and therefore is widely used as a display device of a portable device, a computer, a large television, or the like.

On the other hand, liquid crystals themselves do not emit light and, therefore, in order to display a screen, a backlight unit is often required for emitting light from the back of the liquid crystals.

The backlight unit requires a backlight assembly which comprises light-emitting element boards comprising light-emitting elements such as LEDs (Light Emitting Diodes), a power supply board that supplies power and control signals to the light-emitting elements, and electrically conductive paths such as a harness that connect between the light-emitting element boards and the power supply board.

As a specific structure of the backlight assembly, there is, for example, a structure in which the light-emitting element boards and the power supply board are respectively fixed to the front and back of a chassis and the harness is passed through a hole provided in the chassis, thereby connecting the light-emitting element boards and the power supply board to each other through the harness (Patent Document 1).

In such a structure, however, the hole of the chassis should be filled up in order to prevent contaminants such as dust from entering the inside of the backlight unit through the hole of the chassis.

An example of such a structure will be described with reference to FIGS. 21 to 23.

As shown in FIGS. 21 and 22, a frame 3b is formed around an upper surface (front surface) of a chassis 3. Light-emitting element boards 23a to 23f each comprising light-emitting elements 31 such as LEDs and a light-emitting element connector 33 are screwed to the frame 3b (the light-emitting element boards 23e and 23f are not illustrated).

On the other hand, as shown in FIG. 23, a power supply board 137 that supplies power and control signals to the light-emitting element boards 23a to 23f is screwed to a back surface of the chassis 3 and power supply board connectors 135 are mounted on the power supply board 137.

The light-emitting element boards 23a to 23f and the power supply board 137 are electrically connected to each other through a harness 133. Specifically, the harness 133 comprises one-side ends forming light-emitting element side connectors 43 which are connected to the light-emitting element connectors 33, and the other-side ends forming power supply board side connectors (not illustrated) which are connected to the power supply board connectors 135.

The chassis 3 is provided with a hole 134 for passing the harness 133 therethrough.

The hole 134 is filled with a rubber plug 131 and the rubber plug 131 is provided with small slit-like holes 131a for passing the harness 133 therethrough.

As a method of assembling such a backlight assembly, the following processes are required.

(1) Attach the light-emitting element boards 23a to 23f to the chassis 3.

(2) Connect the light-emitting element side connectors 43 of the harness 133 to the light-emitting element connectors 33 of the light-emitting element boards 23a to 23f and lead out the harness 133 to the back side of the chassis 3 through the hole 134.

(3) Fill the hole 134 with the rubber plug 131.

(4) Fix the power supply board 137 to the back surface of the chassis 3.

(5) Connect the power supply board side connectors of the harness 133 to the power supply board connectors 135 of the power supply board 137.

PRIOR ART DOCUMENT

Patent Document

Patent Document 1: JP-A-2009-295587

SUMMARY OF THE INVENTION

Problem to be Solved by the Invention

However, in the structure in which the boards (the light-emitting element boards 23a to 23f and the power supply board 137) on both front and back surfaces are connected to each other through the connectors by passing the harness through the hole of the chassis as described above, the rubber plug 131, the light-emitting element connectors 33, the power supply board connectors 135, and the harness 133 comprising the connectors at the both-side ends are essential. Consequently, there has been a problem that it is difficult to achieve a further reduction in the number of components and thus to achieve a cost reduction.

According to the above-mentioned structure, the process of passing the harness through the hole of the chassis and connecting the harness to the front and back boards is required in assembling the assembly. However, in the case of a structure that is assembled by stacking (laminating) respective members like a backlight unit (liquid-crystal display device), if such a process of passing the harness through the hole is included, the workability is significantly deteriorated and the number of processes is increased. Consequently, there has been a problem of an increase in manufacturing cost.

Further, there are liquid-crystal display devices that use the same harness and the same light-emitting element boards but use different power supply boards according to the characteristics thereof, while, in the above-mentioned structure, the connectors adapted to the harness-side connectors should be mounted on the power supply board regardless of the kind of power supply board. Consequently, there has been a problem that the degree of freedom of design of the power supply board is small, resulting in high cost.

This invention has been made in view of the above-mentioned problems and it is an object of this invention to provide a backlight assembly wherein a cost reduction is easier than conventional.

Means for Solving the Problem

In order to achieve the above-mentioned object, the first invention is a backlight assembly characterized by comprising a light-emitting element board that is mounted with a light-emitting element and disposed at a peripheral portion of a front surface of a chassis, a power supply board that is disposed on a back surface of the chassis and supplies power to the light-emitting element board, and a relay connector that is held by the chassis and connects between the power supply board and the light-emitting element board, wherein the relay connector comprises a housing that is provided passing through the chassis, and a contact that is held by the housing and electrically connects between the power supply board and the light-emitting element board.

The second invention is a relay connector characterized in that the relay connector is held by a chassis comprising a front surface on which a light-emitting element board mounted with a light-emitting element is disposed at a peripheral portion thereof, and a back surface on which a power supply board that supplies power to the light-emitting element board is disposed, and the relay connector comprises a housing that is provided passing through the chassis, and a contact that is held by the housing and electrically connects between the power supply board and the light-emitting element board.

The third invention is a backlight unit characterized by comprising the backlight assembly according to the first invention.

Effect of the Invention

According to this invention, it is possible to provide a backlight assembly wherein a cost reduction is easier than conventional.

BRIEF DESCRIPTION OF THE DRAWINGS

FIG. 3 shows enlarged views of regions surrounded by dotted lines in FIG. 2, wherein FIG. 3(a) is an enlarged perspective view of a region A, FIG. 3(b) is an enlarged perspective view of a region B, and FIG. 3(c) is an enlarged perspective view of a region C.

FIG. 22 shows enlarged perspective views of regions surrounded by dotted lines in FIG. 21, wherein FIG. 22(a) is an enlarged perspective view of a region α, FIG. 22(b) is an enlarged perspective view of a region β, and FIG. 22(c) is an enlarged perspective view of a region γ.

FIG. 24 is a perspective view showing a backlight assembly 1a.

FIG. 26 is a perspective view showing a relay connector 21a.

FIG. 27 is a perspective view showing a housing 61a.

FIG. 28 is a perspective view showing a contact 69a.

FIG. 29 is a perspective view showing a process of assembling the relay connector 21a.

MODE FOR CARRYING OUT THE INVENTION

Hereinbelow, preferred embodiments of this invention will be described in detail with reference to the drawings.

First, referring to FIG. 1, the structure of a liquid-crystal display device 100 (and a backlight unit 200) comprising a backlight assembly 1 according to a first embodiment will be described.

Figure 1:
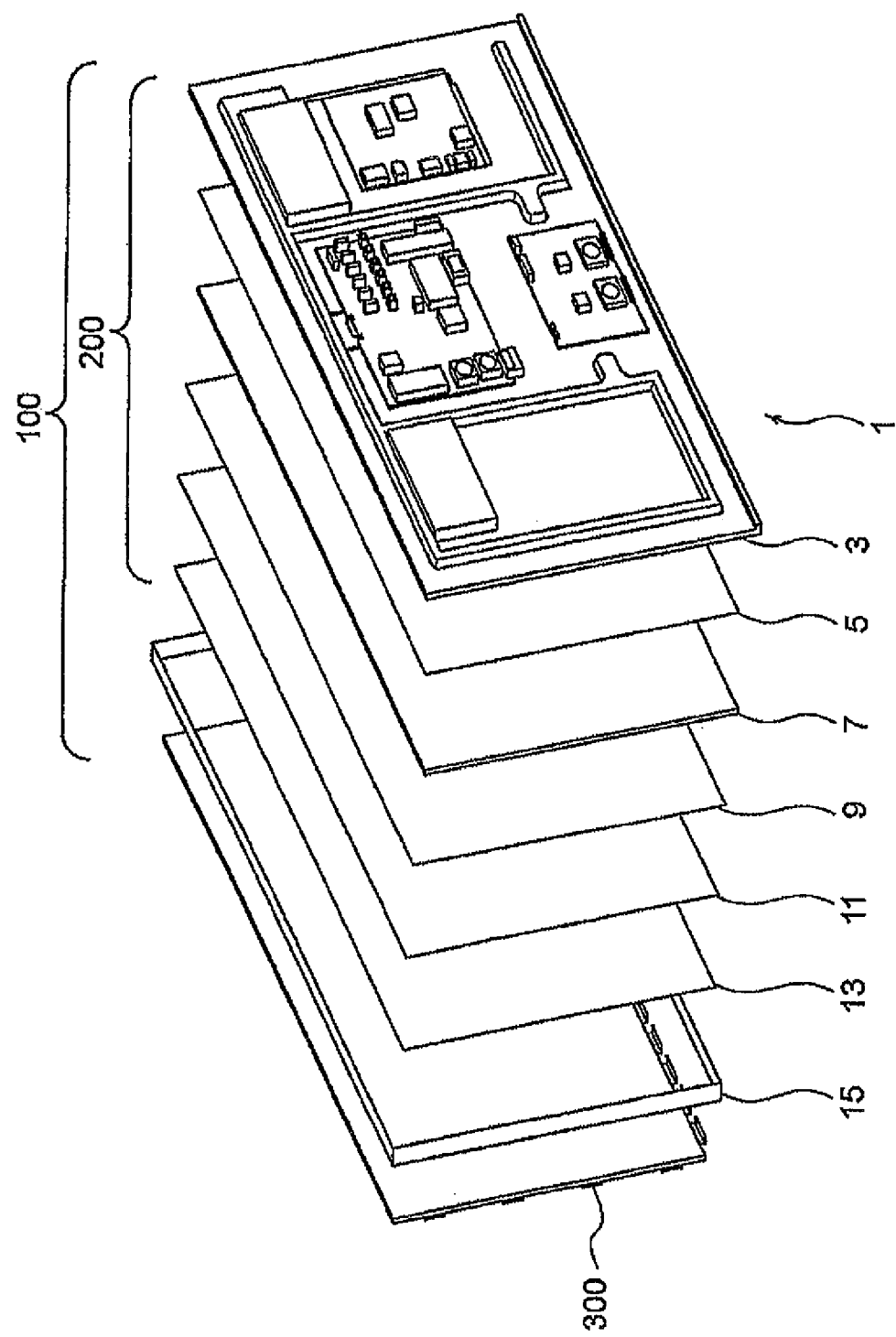
FIG. 1 is an exploded perspective view showing a liquid-crystal display device 100 and a backlight unit 200.

As shown in FIG. 1, the liquid-crystal display device 100 has a structure in which a liquid-crystal display portion 300 using liquid crystals and the backlight unit 200 adapted to emit light to the liquid-crystal display portion 300 are mounted on a frame 15.

The backlight unit 200 comprises a chassis 3 of the backlight assembly 1 and a reflective sheet 5, a light guide plate 7, a diffusion sheet 9, a prism sheet 11, and a condensing sheet 13 which are stacked on the chassis 3.

Next, the structure of the backlight assembly 1 will be described with reference to FIGS. 2 to 14.

First, referring to FIGS. 2 to 6, the structure of the backlight assembly 1 will be briefly described.

Figure 2:
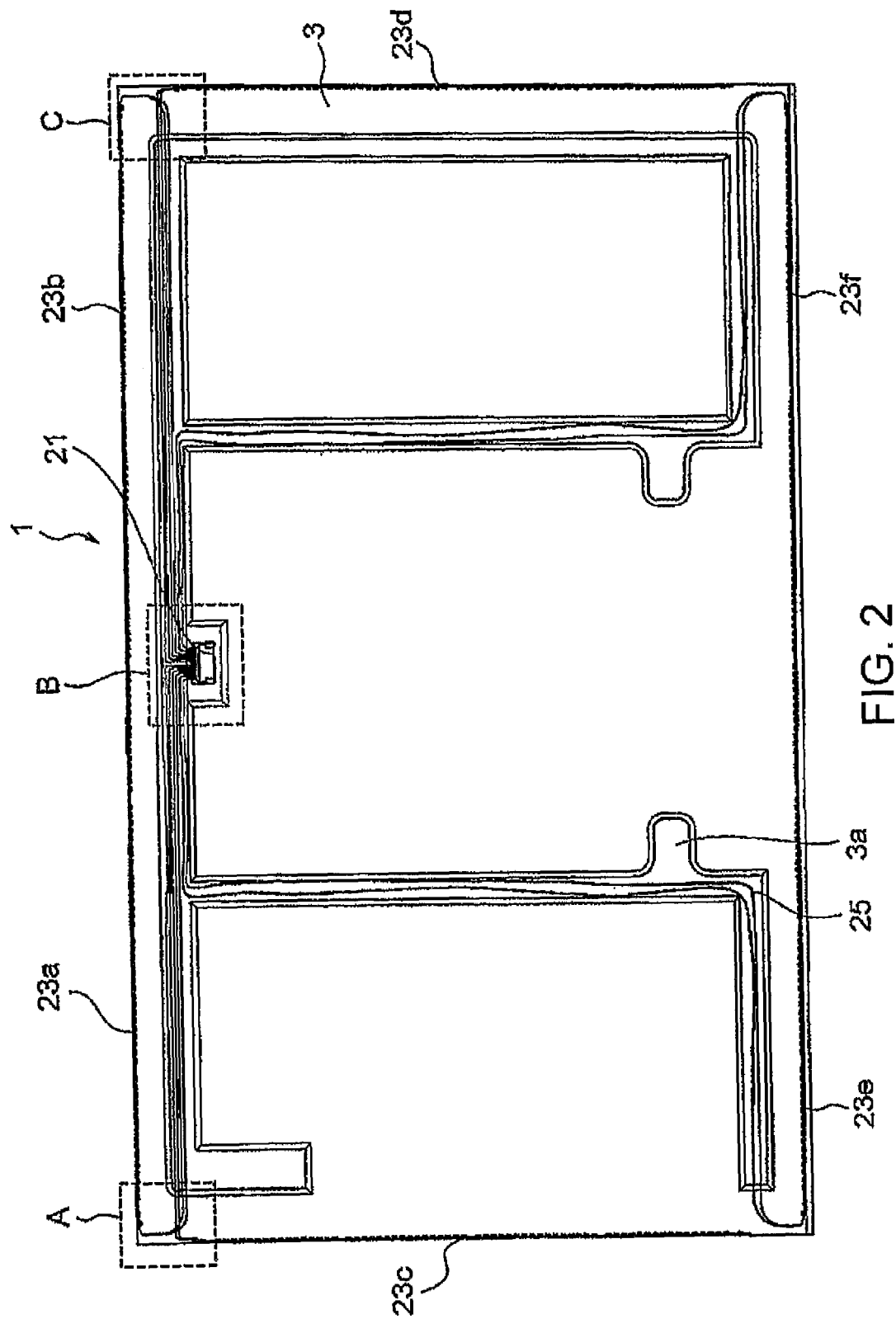
FIG. 2 is a plan view (top view) showing a chassis 3 of a backlight assembly 1.
Figure 3:
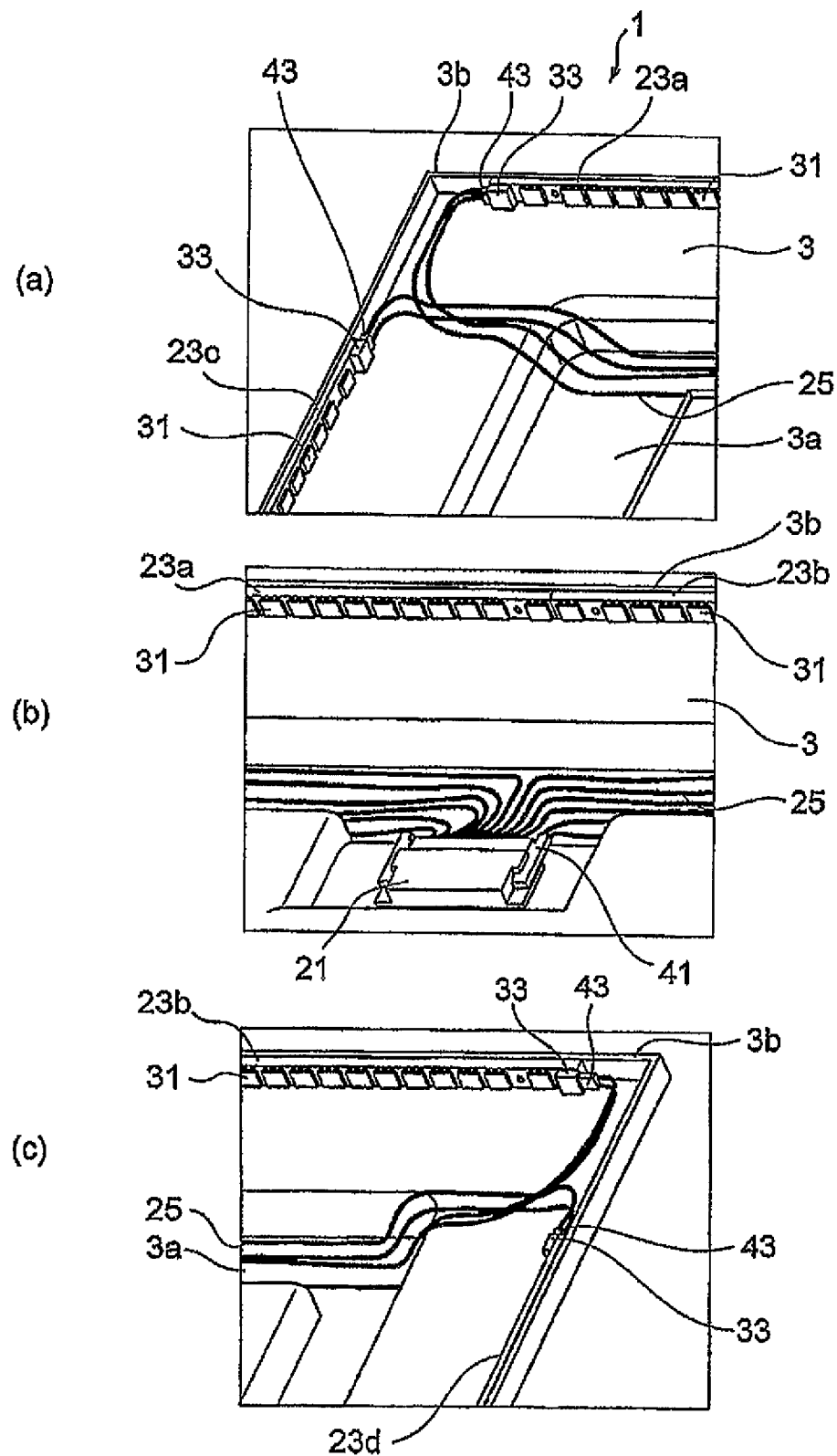
Figure 4:
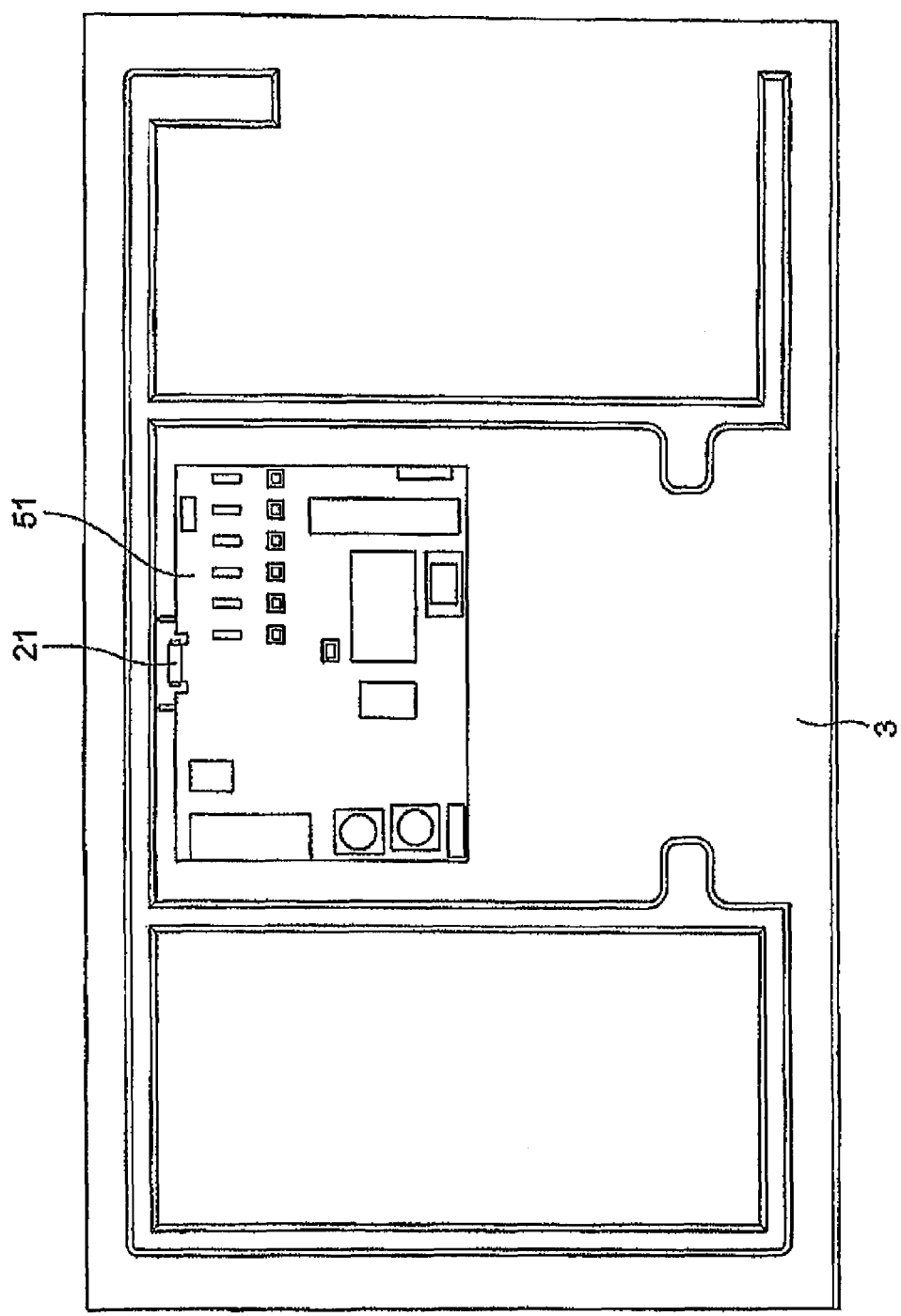
FIG. 4 is a rear view (bottom view) of FIG. 2.

As shown in FIGS. 2 to 4, the backlight assembly 1 comprises light-emitting element boards 23a to 23f that are provided on a frame 3b around an upper surface (a front surface, i.e. a surface on the liquid-crystal display portion 300 side) of the chassis 3 made of a metal, a power supply board 51 that is provided on a back surface of the chassis 3, a relay connector 21 that is held by the chassis 3 and electrically connects between the power supply board 51 and the light-emitting element boards 23a to 23f, and a harness 25 (electrically conductive paths) that connects between the light-emitting element boards 23a to 23f and the relay connector 21.

Figure 5:
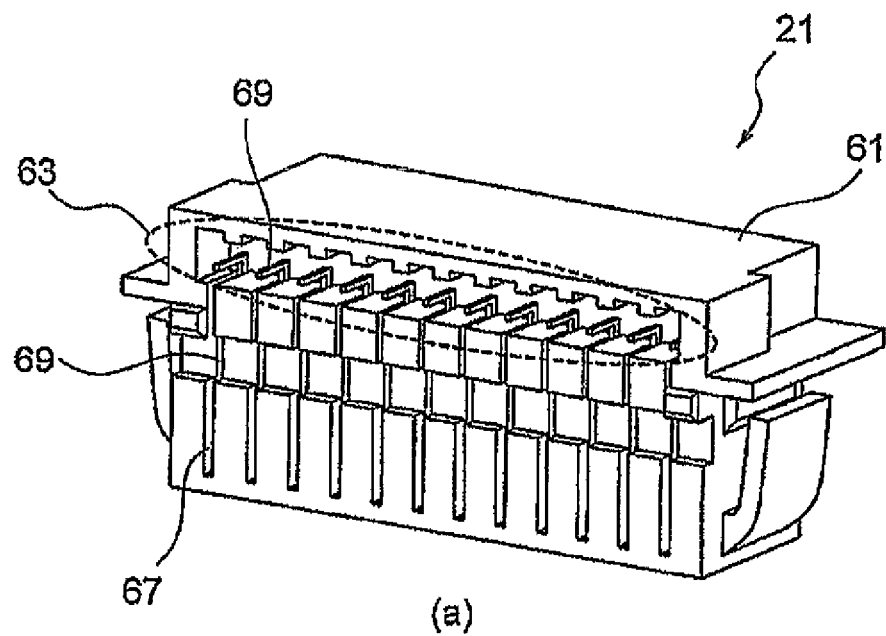
FIG. 5 includes FIG. 5(a) which is a perspective view of a relay connector 21 of FIG. 2 and FIG. 5(b) which is a perspective view corresponding to FIG. 5(a) as seen from the opposite side.
Figure 5:
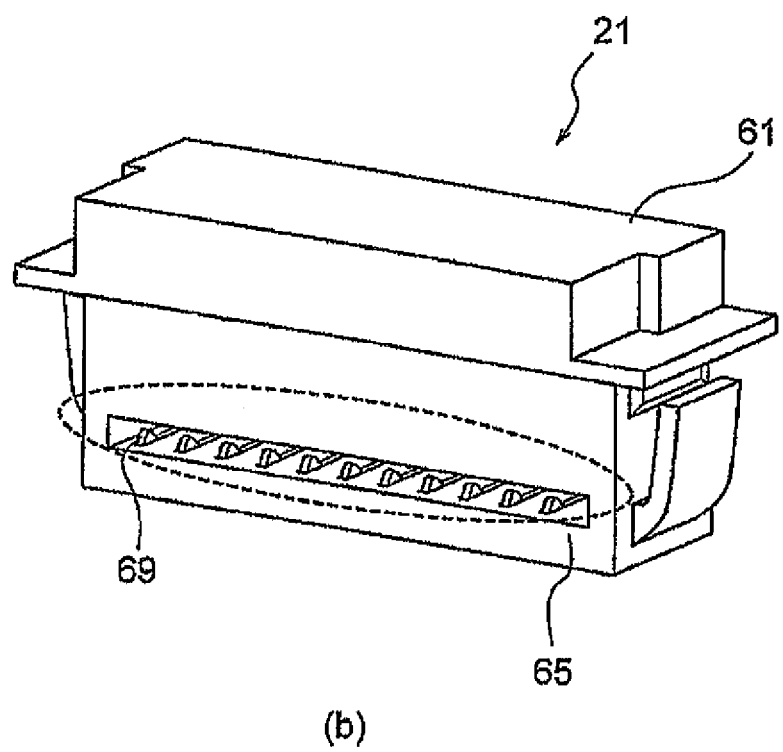
Figure 6:
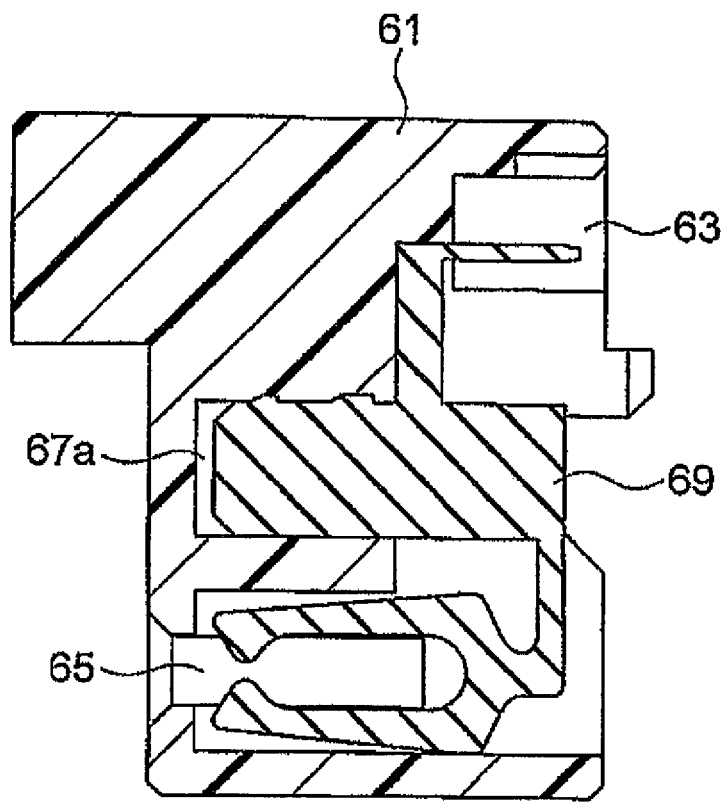
FIG. 6 is a longitudinal sectional view of FIG. 5(b).

As shown in FIGS. 5 and 6, the relay connector 21 comprises conductive contacts 69 that electrically connect between the power supply board 51 and the light-emitting element boards 23a to 23f, and an insulating housing 61 that is provided passing through the chassis 3 and holds the contacts 69.

Next, referring to FIGS. 2 to 14, the structures of the respective members that form the backlight assembly 1 will be concretely described.

First, the structure of the light-emitting element boards 23a to 23f will be described with reference to FIG. 7.

Since the light-emitting element boards 23a to 23f have the same structure, the structure of only the light-emitting element board 23a will be described herein.

Figure 7:
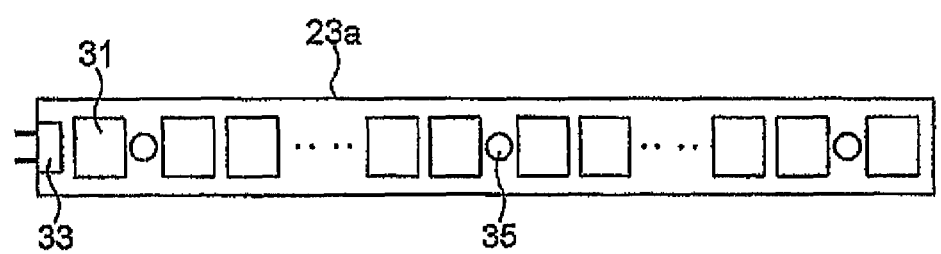
FIG. 7 is a plan view showing a fight-emitting element board 23a of FIG. 3(a), wherein dotted lines indicate portions where illustration of light-emitting elements 31 is omitted.

As shown in FIG. 7, the light-emitting element board 23a is a strip-like board comprising, on a surface thereof, a predetermined number of LED light-emitting elements 31 arranged in a row.

A light-emitting element connector 33 (herein, a male connector is illustrated) for connection to the harness 25 is provided at one end of the light-emitting element board 23a. The light-emitting elements 31 are electrically connected to the light-emitting element connector 33 by non-illustrated board wiring.

Further, the light-emitting element board 23a comprises screw holes 35 provided between the light-emitting elements 31.

Next, the structure of the power supply board 51 will be described with reference to FIGS. 8 and 9.

Figure 8:
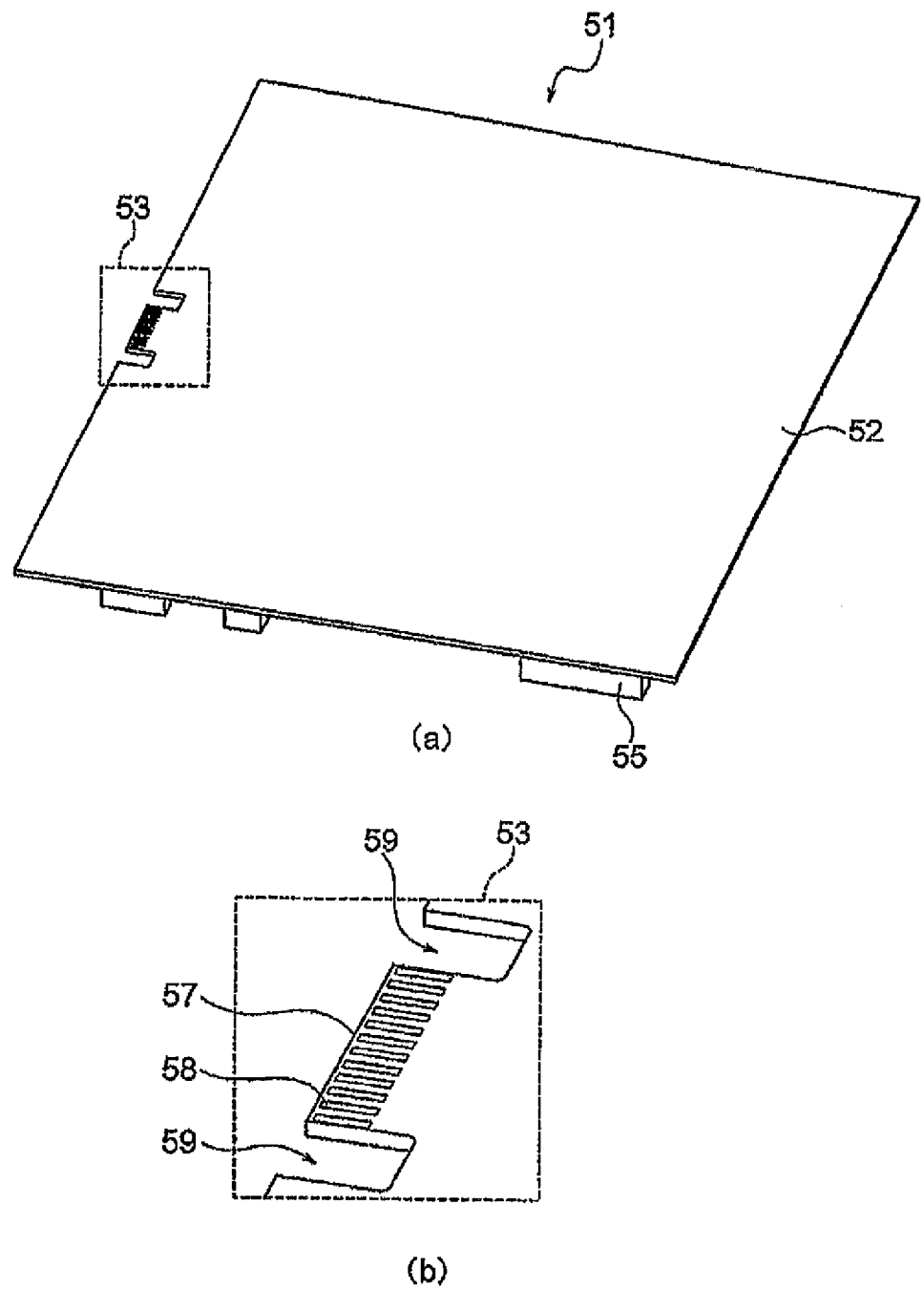
FIG. 8 includes FIG. 8(a) which is a perspective view of a power supply board 51 of FIG. 4 as seen from its back side and FIG. 8(b) which is an enlarged perspective view of a region surrounded by a dotted line in FIG. 8(a).
Figure 9:
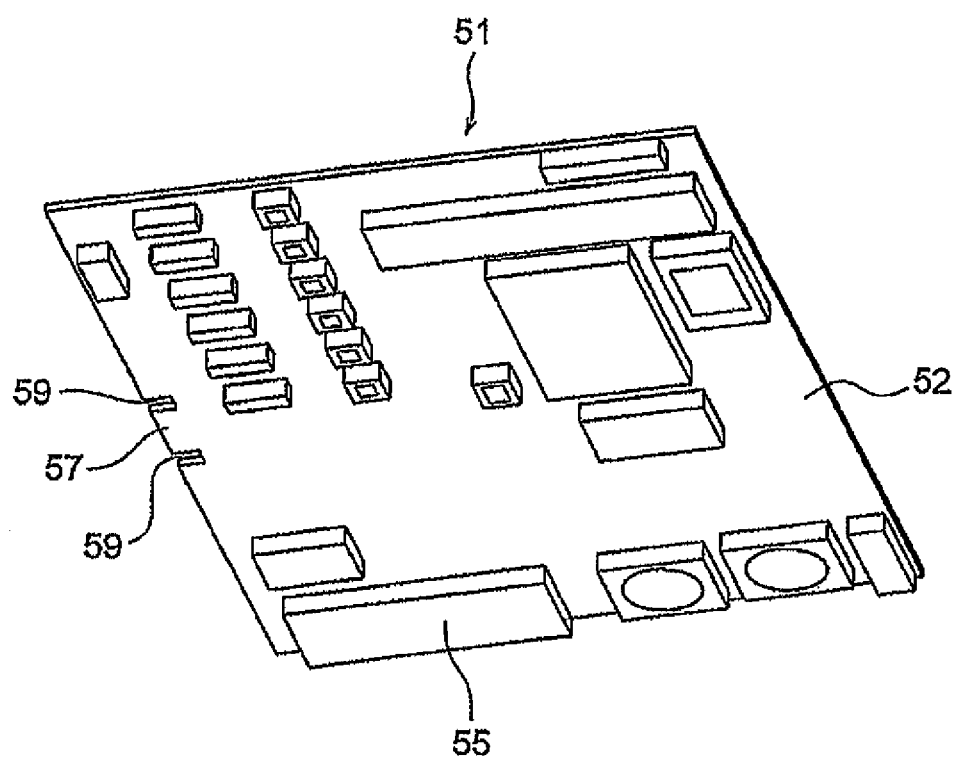
FIG. 9 is a perspective view of the power supply board 51 of FIG. 4 as seen from its front side.

As shown in FIGS. 8 and 9, the power supply board 51 comprises a board 52. An electronic component 55 for supplying power to and (according to need) controlling light emission of the light-emitting elements 31 is mounted on a surface of the board 52.

Further, a part of the outer periphery of the power supply board 51 forms a connecting portion 53 for connection to the relay connector 21.

Specifically, the connecting portion 53 comprises two cut-out portions 59 formed by cutting out the outer periphery of the board 52 and a convex region sandwiched between the cut-out portions 59 forms a board-side connecting portion 57 which is to be inserted into the relay connector 21.

The board-side connecting portion 57 has a surface formed with conductive patterns 58 which are to be brought into contact with the contacts 69 of the relay connector 21.

Next, referring to FIGS. 3, 10, and 11, the structure of the harness 25 will be described.

Figure 10:
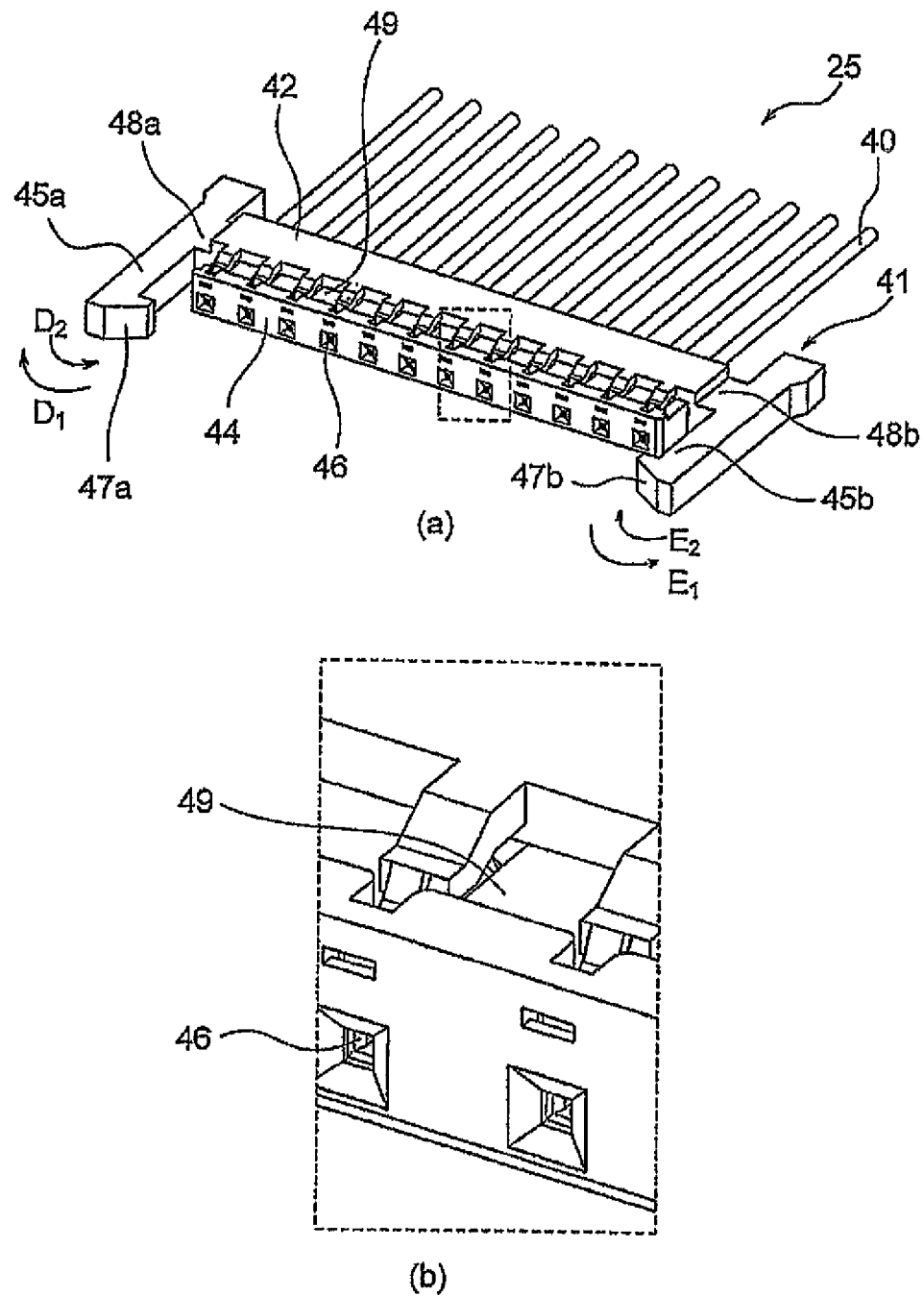
FIG. 10 includes FIG. 10(a) which is a perspective view of a harness 25 of FIG. 3 in the vicinity of a harness connector 41 and FIG. 10(b) which is an enlarged perspective view of a region surrounded by a dotted line in FIG. 10(a).
Figure 11:
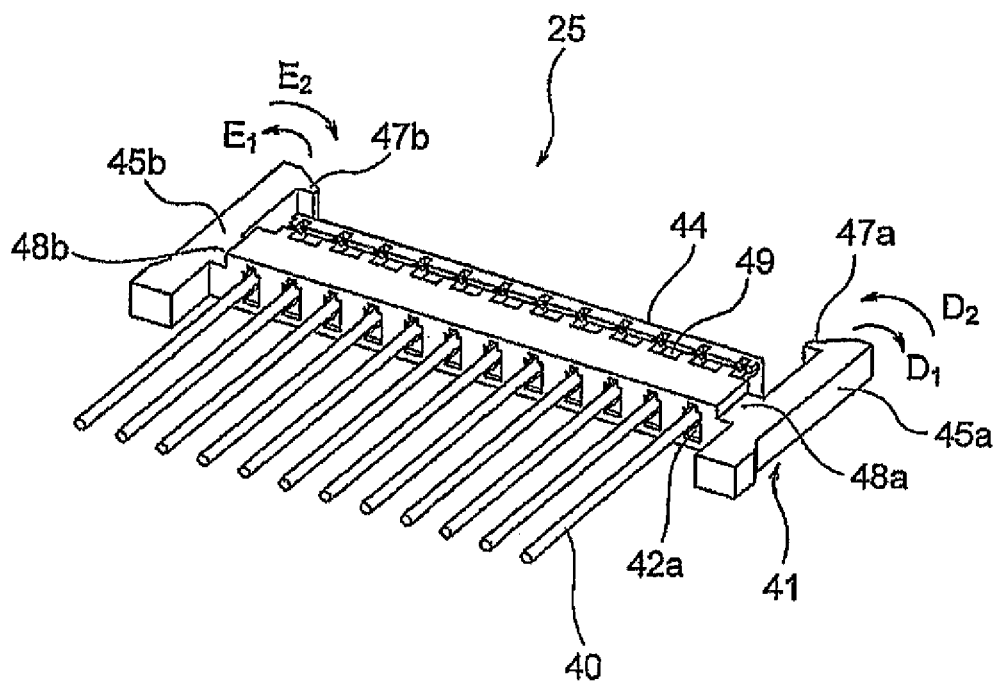
FIG. 11 is a perspective view corresponding to FIG. 10(a) as seen from the opposite side.
Figure 12:
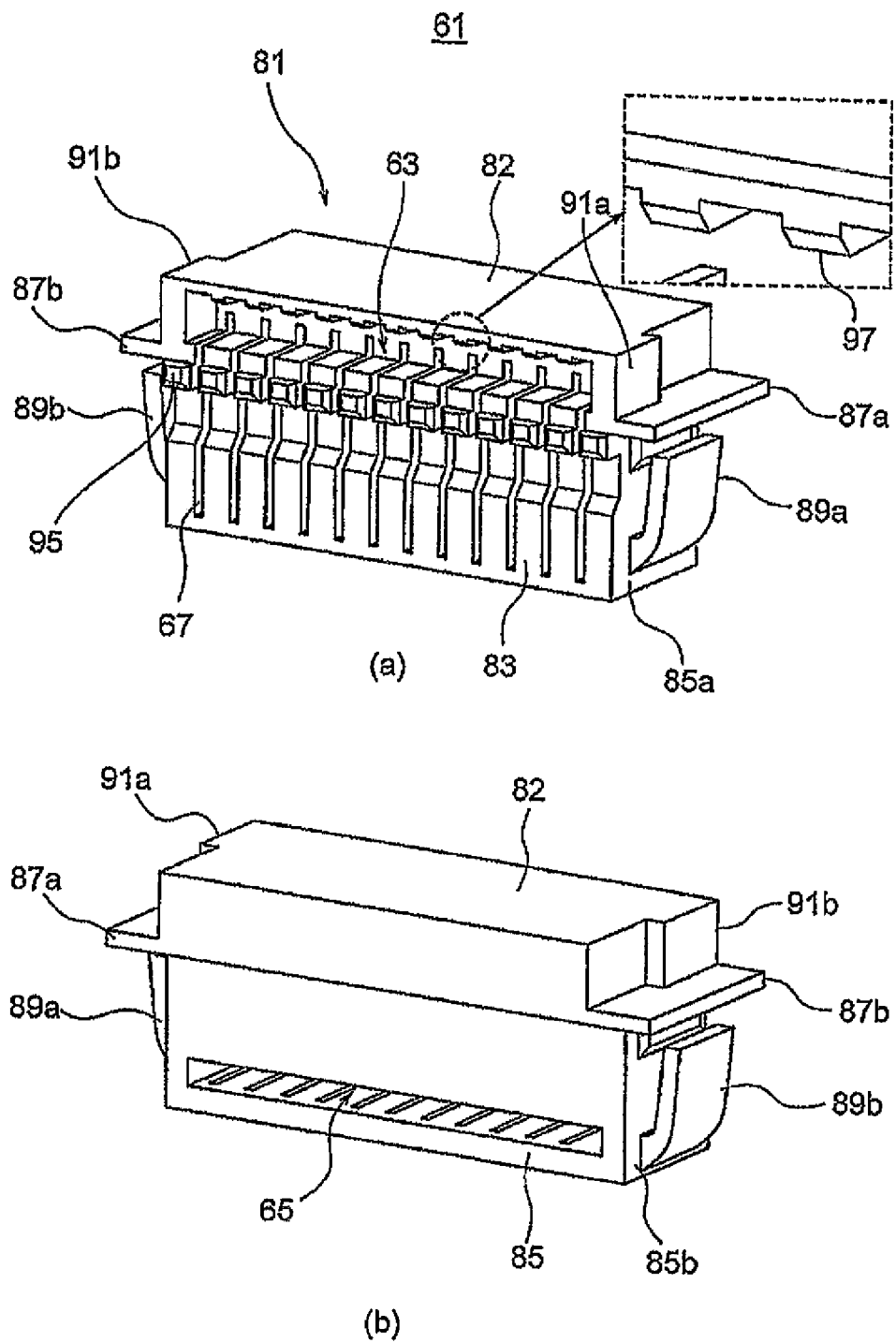
FIG. 12 includes FIG. 12(a) which is a perspective view of a housing 61 of the relay connector 21 of FIG. 2 and FIG. 12(b) which is a perspective view corresponding to FIG. 12(a) as seen from the opposite side.

As shown in FIGS. 3, 10, and 11, the harness 25 comprises linear wire harnesses 40 for drawing around the harness 25, light-emitting element side connectors 43 provided at one-side ends of the wire harnesses 40 and having a shape (herein a female type) corresponding to that of the light-emitting element connectors 33 of the light-emitting element boards 23a to 23f, and a harness connector 41 provided at the other-side ends of the wire harnesses 40 for connection to the relay connector 21.

The harness connector 41 is made of an insulating resin or the like. As shown in FIGS. 10 and 11, the harness connector 41 comprises an elongated plate-like housing 42 and an elongated plate-like insertion portion 44, which is a portion to be inserted into the relay connector 21, is protrudingly provided on the front side of the housing 42 (in its longitudinal direction).

Contact holes 46 into which the contacts 69 are to be inserted are provided on the front side of the insertion portion 44 (in its longitudinal direction) and a conductive harness-side contact 46a (see FIG. 20) which is to be brought into contact with the contact 69 is provided in each contact hole 46.

Further, concave portions 49 which serve as guides at the time of inserting the insertion portion 44 into the relay connector 21 are formed on an upper surface of the insertion portion 44.

On the other hand, on both sides of the housing 42, there are respectively provided rod-like hook portions 45a and 45b protruding in a direction perpendicular to the longitudinal direction of the housing 42, that is, in a protruding direction of the insertion portion (i.e. in an insertion direction of the harness connector 41 into the relay connector 21).

The hook portions 45a and 45b are members for fixing the harness connector 41 to the relay connector 21 and front ends of the hook portions 45a and 45b form claw portions 47a and 47b protruding (inward) to positions facing each other. The claw portions 47a and 47b each form a tapered portion inclined inward from the outside.

The hook portions 45a and 45b are respectively rotatable with respect to connecting portions 48a and 48b with the housing 42 as fulcrums in directions of arrows D1 and E1 (directions in which the claw portions 47a and 47b move away from each other) and in directions of arrows D2 and E2 (directions in which the claw portions 47a and 47b approach each other) in FIGS. 10 and 11.

Figure 20:
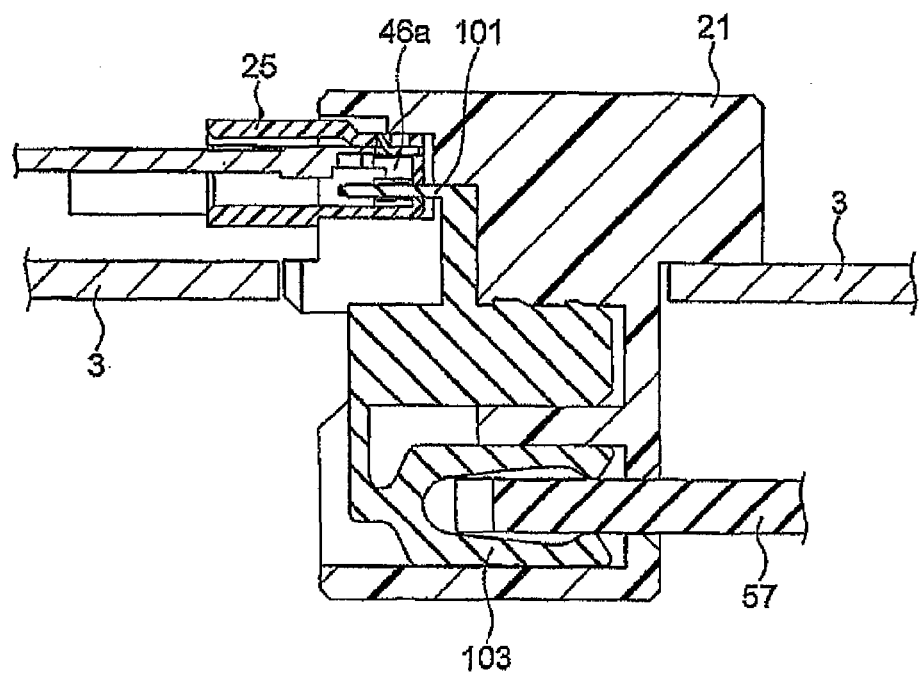
FIG. 20 is a diagram showing a process of assembling the backlight assembly 1.
Figure 21:
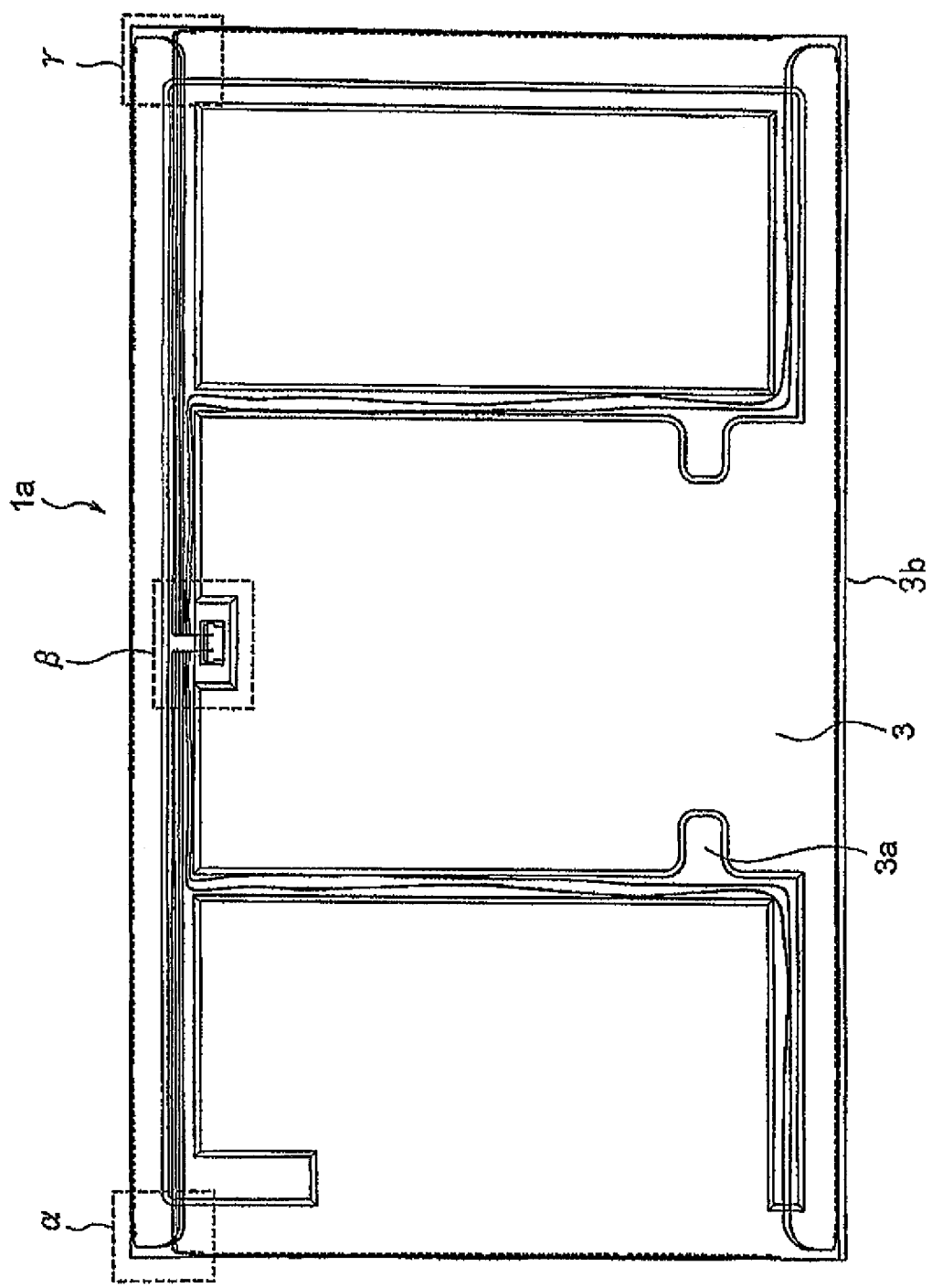
FIG. 21 is a plan view showing an example of a conventional backlight assembly.
Figure 22:
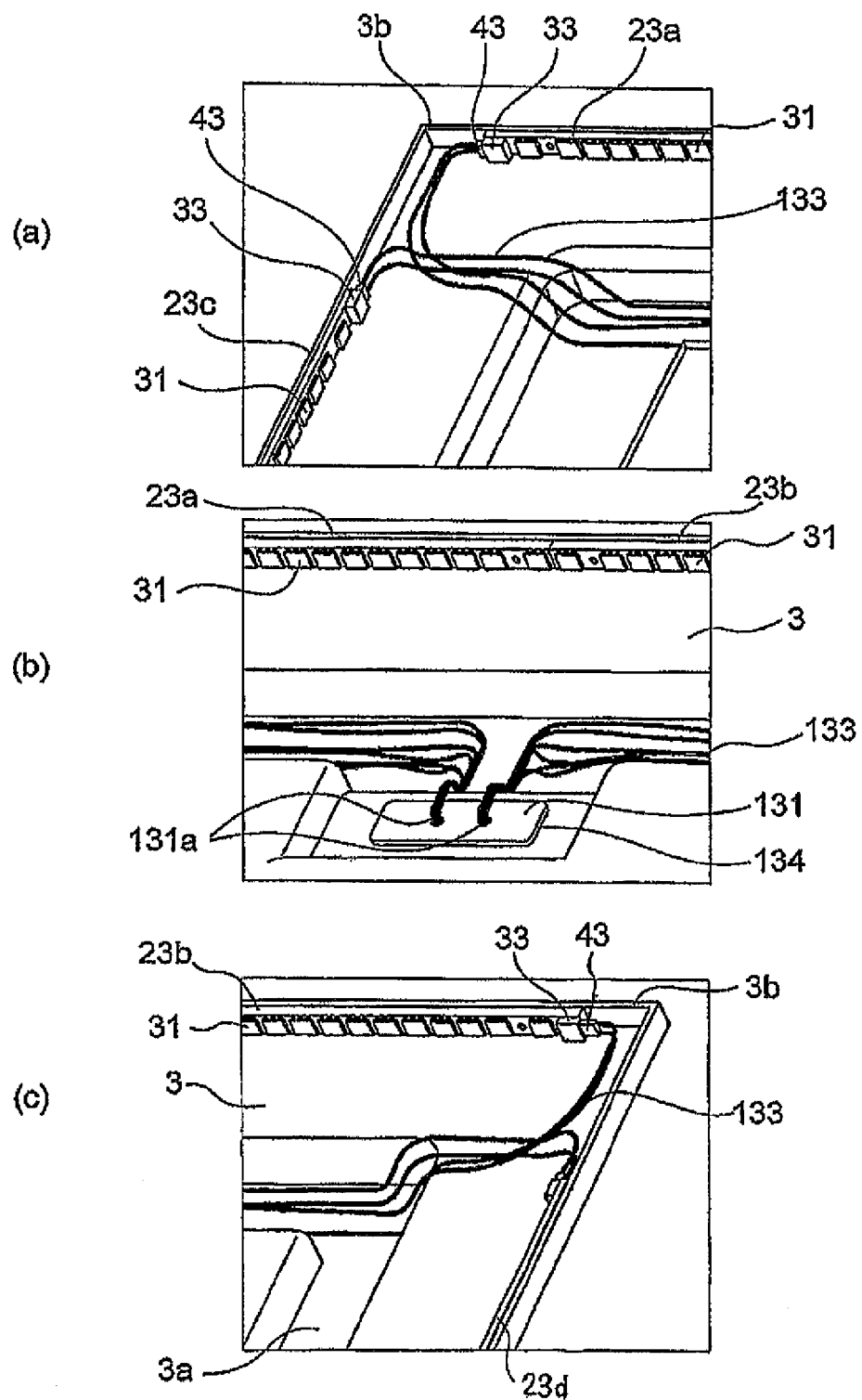
Figure 23:
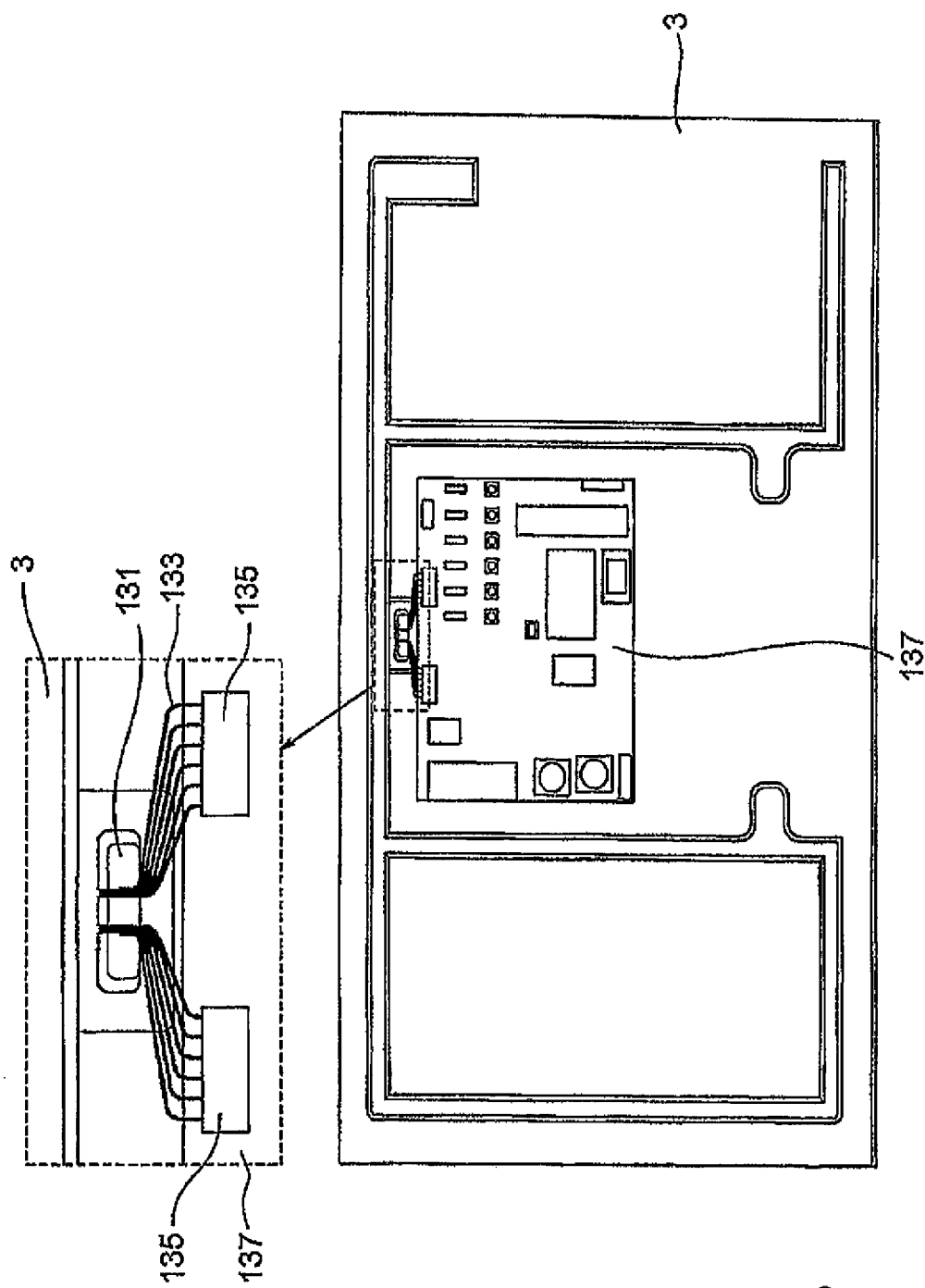
FIG. 23 is a rear view of FIG. 21.

The wire harnesses 40 are inserted into holes 42a provided on the back side of the housing 42 so that the front ends of the wire harnesses 40 are connected to the harness-side contacts 46a (see FIG. 20).

Next, referring to FIGS. 5, 6, 12, and 13, the structure of the housing 61 of the relay connector 21 will be described.

As shown in FIGS. 5, 6, 12, and 13, the housing 61 comprises a housing body 81 made of an insulating resin and having an oblong box-like external shape. At an upper end of a front surface 83 of the housing body 81, a harness insertion hole 63 for insertion of the insertion portion 44 of the harness connector 41 is provided along a longitudinal direction of the housing body 81.

Herein, it is assumed that the surface including the longitudinal direction and provided with the harness insertion hole 63 is the "front surface 83", that a surface including sides in the longitudinal direction and closer to the harness insertion hole 63 is an "upper surface 82", and that a surface including sides in the longitudinal direction and farther from the harness insertion hole 63 is a "lower surface 88".

An inner upper wall of the harness insertion hole 63 is provided with convex portions 97 having a shape corresponding to that of the concave portions 49 of the insertion portion 44 of the harness connector 41.

At a lower end of a back surface 85 of the housing body 81, a power supply board insertion hole 65 for insertion of the board-side connecting portion 57 of the power supply board 51 is provided along the longitudinal direction of the housing body 81. In order to facilitate insertion of the board-side connecting portion 57, the entrance periphery of the power supply board insertion hole 65 forms a tapered portion.

On the other hand, on side surfaces 85*a* and 85*b* of the housing body 81, flange portions 87*a* and 87*b* for holding the housing 61 to the chassis 3 are protrudingly provided parallel to the longitudinal direction so as to be located between the harness insertion hole 63 and the power supply board insertion hole 65.

Since it is sufficient that the flange portions 87*a* and 87*b* are located between the harness insertion hole 63 and the power supply board insertion hole 65, the flange portions 87*a* and 87*b* may be provided so as to surround the periphery (front surface 83, back surface 85, and side surfaces 85*a* and 85*b*) of the housing 61, i.e. not only on the side surfaces 85*a* and 85*b*.

On the other hand, at positions, below the flange portions 87*a* and 87*b*, on the side surfaces 85*a* and 85*b* of the housing body 81, there are provided cantilever-like elastic portions 89*a* and 89*b* which are formed so as to protrude toward (end portions of) the flange portions 87*a* and 87*b*.

Figure 13:
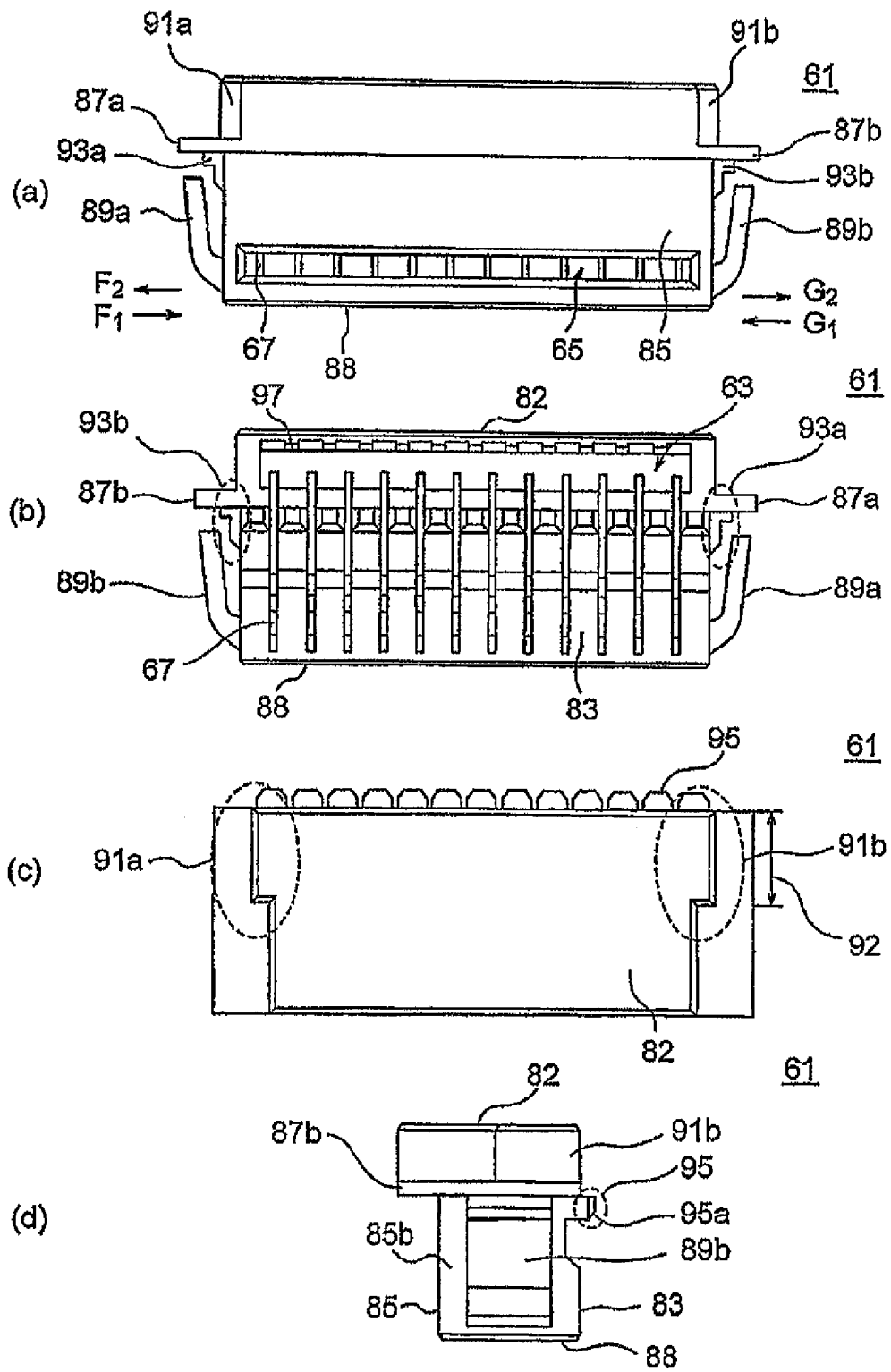
FIG. 13 includes FIG. 13(a) which is a rear view of the housing 61 of the relay connector 21, FIG. 13(b) which is a front view thereof, FIG. 13(c) which is a plan view (top view) thereof, and FIG. 13(d) which is a left side view thereof.

The elastic portions 89*a* and 89*b* are members for holding the housing 61 to the chassis 3 jointly with the flange portions 87*a* and 87*b* and are elastically deformable with respect to connecting portions with the side surfaces 85*a* and 85*b* as fulcrums in directions F1 and G1 (directions approaching the side surfaces 85*a* and 85*b*) and in directions F2 and G2 (directions away from the side surfaces 85*a* and 85*b*) in FIG. 13.

As will be described later, since the housing body 81 is fixed to the chassis 3 by holding the chassis 3 between the flange portions 87*a* and 87*b* and the elastic portions 89*a* and 89*b*, the distance between a bottom surface of the flange portion 87*a*, 87*b* and (an end portion of) the elastic portion 89*a*, 89*b* is set to be approximately equal to the thickness of the chassis 3.

Further, projections 93*a* and 93*b* for preventing the elastic portions 89*a* and 89*b* from being excessively deformed and broken are provided at positions, facing the free ends of the elastic portions 89*a* and 89*b*, on the side surfaces 85*a* and 85*b* of the housing body 81.

The projections 93*a* and 93*b* are normally not in contact with the elastic portions 89*a* and 89*b*, but are brought into contact with the elastic portions 89*a* and 89*b* when the elastic portions 89*a* and 89*b* are excessively deformed in the directions F1 and G1 due to an external force or the like, thereby inhibiting further deformation of the elastic portions 89*a* and 89*b* to prevent breakage thereof.

On the other hand, contact insertion holes 67 for insertion of the contacts 69 are provided on the front surface 83 of the housing body 81. The contact insertion holes 67 are in the form of slits extending from the upper surface 82 toward the lower surface 88.

The contact insertion holes 67 are provided so as to pass through the harness insertion hole 63 and the power supply board insertion hole 65.

Further, the contact insertion holes 67 each comprise a protruding portion press-fitting hole 67*a* which is located between the power supply board insertion hole 65 and the harness insertion hole 63 and into which a press-fitting portion 105 of the later-described contact 69 is to be press-fitted (see FIG. 6).

Further, at positions, above the flange portions 87*a* and 87*b*, on the side surfaces 85*a* and 85*b* of the housing body 81, there are provided convex locking portions 91*a* and 91*b* for fixing the harness 25 to the relay connector 21.

As will be described later, the locking portions 91*a* and 91*b* are portions that engage with the hook portions 45*a* and 45*b* when the insertion portion 44 of the harness connector 41 is inserted into the harness insertion hole 63, and the width 92, in the front surface direction, of each locking portion corresponds to the distance between the claw portion 47*a*, 47*b* and the connecting portion 48*a*, 48*b* of the hook portion 45*a*, 45*b*.

On the other hand, a plurality of projecting portions 95 are provided at positions, just below the flange portions 87*a* and 87*b*, on the front surface 83 of the housing body 81. The reason for providing the projecting portions 95 is as follows.

First, in the first embodiment, the chassis 3 and the contacts 69 are the conductors (metals) and the relay connector 21 is fixed to the chassis 3, and therefore, the structure is such that, as compared with the conventional structure, the chassis 3 and the portions (contacts 69) where the conductive portions of the harness 25 are exposed tend to be close to each other.

In particular, as will be described later, since tips (pin contacts 101) of the contacts 69 are disposed in the harness insertion hole 63, if the pin contacts 101 and the chassis 3 are too close to each other, there is a possibility that discharge occurs between the pin contacts 101 and the chassis 3 when the backlight assembly 1 is turned on.

In view of this, the projecting portions 95 are provided to keep the pin contacts 101 and the chassis 3 apart from each other, thereby preventing discharge therebetween.

That is, the projection length of each projecting portion 95 is required to be long enough to prevent discharge between the pin contacts 101 and the chassis 3 when the backlight assembly 1 is turned on.

Next, the structure of the contact 69 will be described with reference to FIG. 14.

Figure 14:
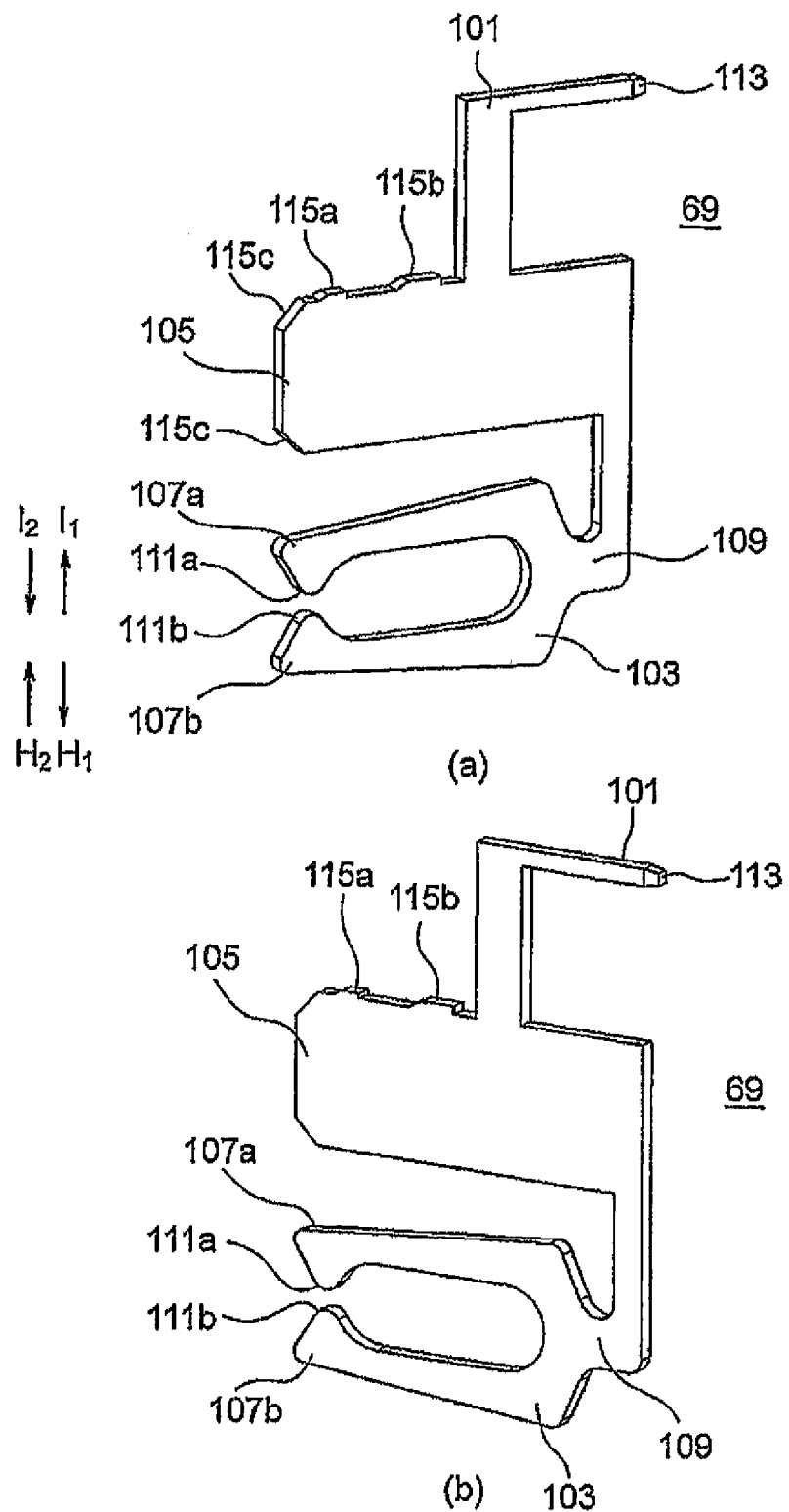
FIG. 14 is perspective views showing a contact 69.

As shown in FIG. 14, the contact 69 is a plate-like conductive member (material is, for example, phosphor bronze) having elasticity and comprises a pin-like pin contact 101 (electrically conductive path connecting portion) for connection to the harness 25, a clip-like elastic contact 103 (power supply board connecting portion) for connection to the power supply board 51, and a press-fitting portion 105 which is provided between the pin contact 101 and the elastic contact 103 for fixing the contact 69 to the housing body 81. In the following description, it is assumed that the side where the pin contact 101 is provided is the "upper side" while the side where the elastic contact 103 is provided is the "lower side".

To explain the contact 69 in more detail, the pin contact 101 is a pin-like member extending in an L-shape from an upper end portion of the press-fitting portion 105 and comprising a free end forming a tapered portion 113.

On the other hand, the elastic contact 103 is a member extending in an L-shape in a direction opposite to that of the pin contact 101 from a lower end portion of the press-fitting portion 105 and comprising a free end with an upper contact 107*a* and a lower contact 107*b* which are bifurcated from a connecting portion 109.

The upper contact 107*a* and the lower contact 107*b* respectively comprise projecting portions 111*a* and 111*b* that are provided so as to project from surfaces (inner surfaces) facing each other and, in order to facilitate insertion of the board-side connecting portion 57 of the power supply board 51, free end portions of the projecting portions 111*a* and 111*b* are tapered inward from the outside.

The upper contact 107*a* and the lower contact 107*b* are elastically deformable with respect to the connecting portion 109 as a fulcrum in directions I1 and H1 (directions away from each other) and in directions I2 and H2 (directions approaching each other), thereby capable of holding the board-side connecting portion 57 of the power supply board 51 therebetween for connection thereof.

Further, the press-fitting portion 105 has a shape corresponding to that of the protruding portion press-fitting hole 67a of the housing body 81 and, in order to prevent the contact 69 from coming off the housing body 81 after press-fitting, the press-fitting portion 105 comprises press-fitting holding portions 115a and 115b projecting from an upper end thereof.

Further, corners of a free end of the press-fitting portion 105 comprise tapered portions 115c (are chamfered), thereby making it possible to smoothly press-fit the press-fitting portion 105.

Next, the sequence of assembly of the backlight assembly 1 will be described with reference to FIGS. 2, 3, and 15 to 20.

First, the light-emitting element boards 23a to 23f are fixed to the chassis 3.

Specifically, as shown in FIG. 3(a) and FIG. 3(c), the light-emitting element boards 23a to 23f are fixed to the inner periphery of the frame 3b of the chassis 3 by non-illustrated screws. The arrangement of the light-emitting element boards 23a to 23f is as shown in FIG. 2.

In the fixation, in order to facilitate dissipation of heat generated by light emission of the light-emitting elements 31, a plate made of a material such as aluminum excellent in heat dissipation property may be interposed between the frame 3b and the light-emitting element boards 23a to 23f.

Figure 15:
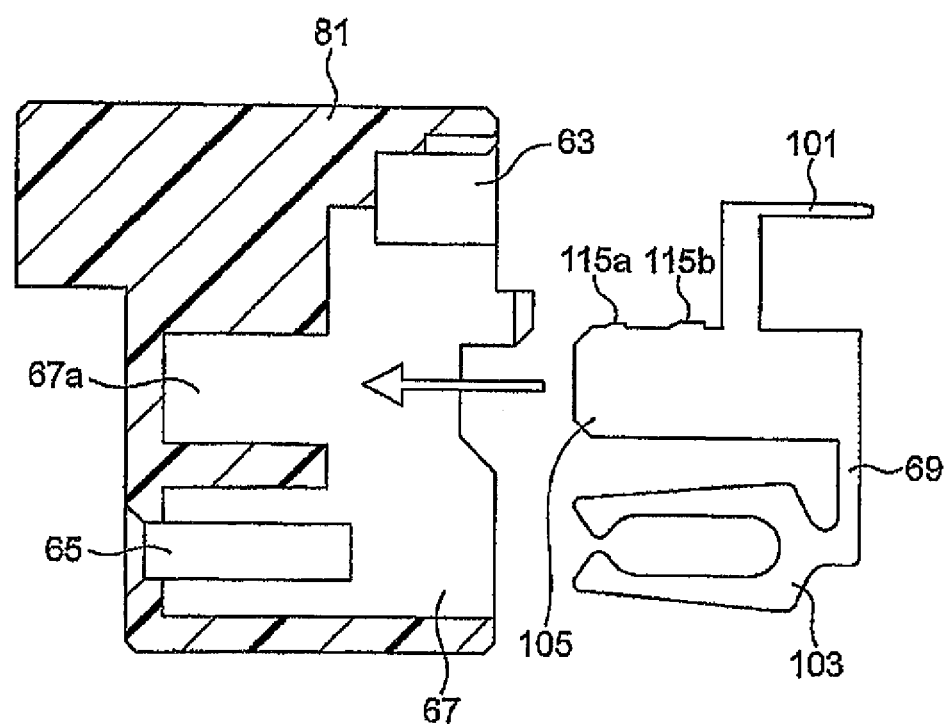
FIG. 15 is a diagram showing a process of assembling the backlight assembly 1.

Then, as shown in FIG. 15, the relay connector 21 is assembled in advance.

Specifically, as shown in FIG. 15, the press-fitting portion 105 of each contact 69 is press-fitted into the protruding portion press-fitting hole 67a of the housing body 81 so that the pin contact 101 and the elastic contact 103 are disposed in the harness insertion hole 63 and the power supply board insertion hole 65, respectively.

In this event, since the press-fitting holding portions 115a and 115b bite into an upper wall of the protruding portion press-fitting hole 67a, the contact 69 can be held by the housing 61 (housing body 81) more securely.

Figure 16:
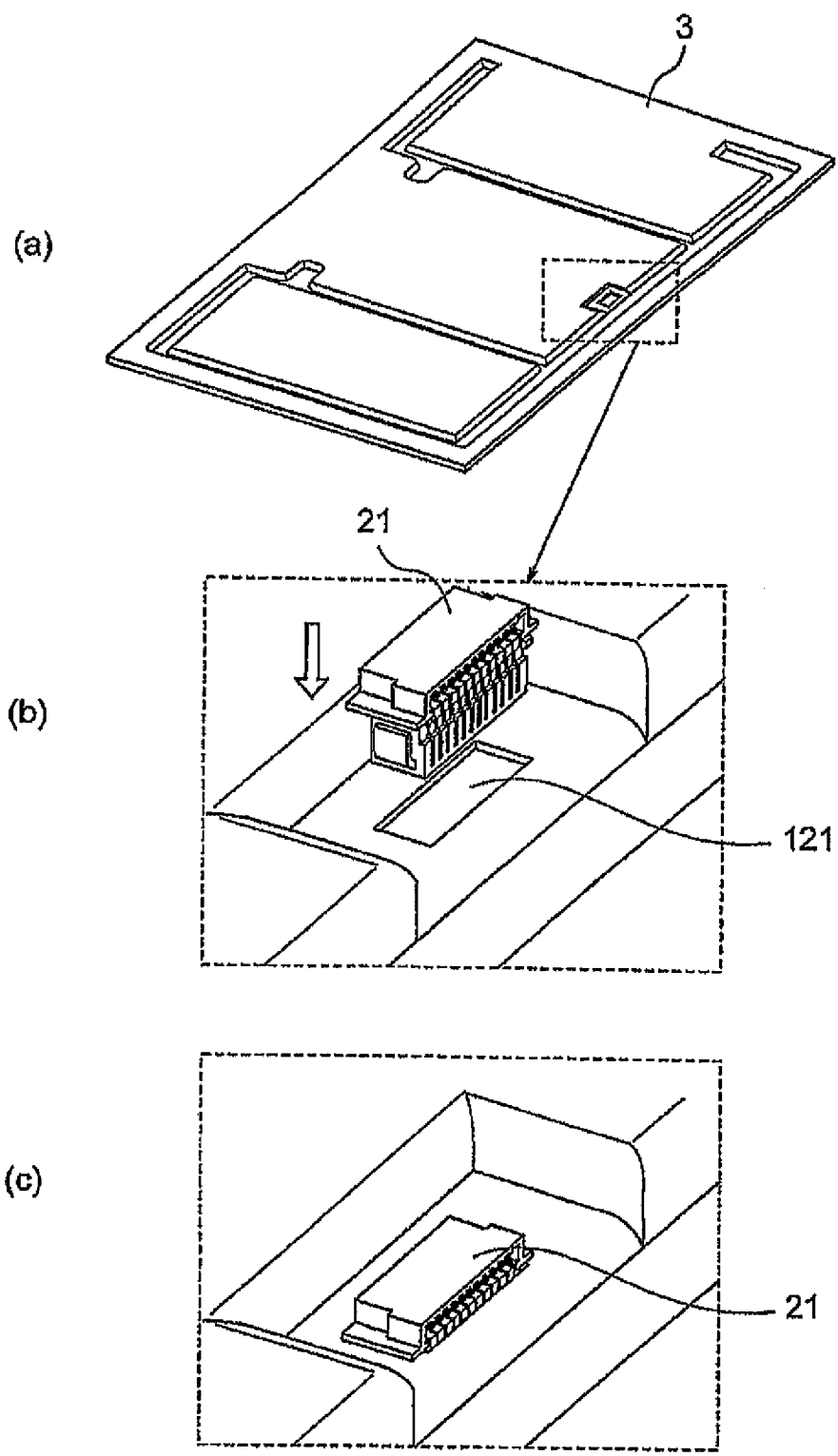
FIG. 16 is diagrams showing a process of assembling the backlight assembly 1.
Figure 17:
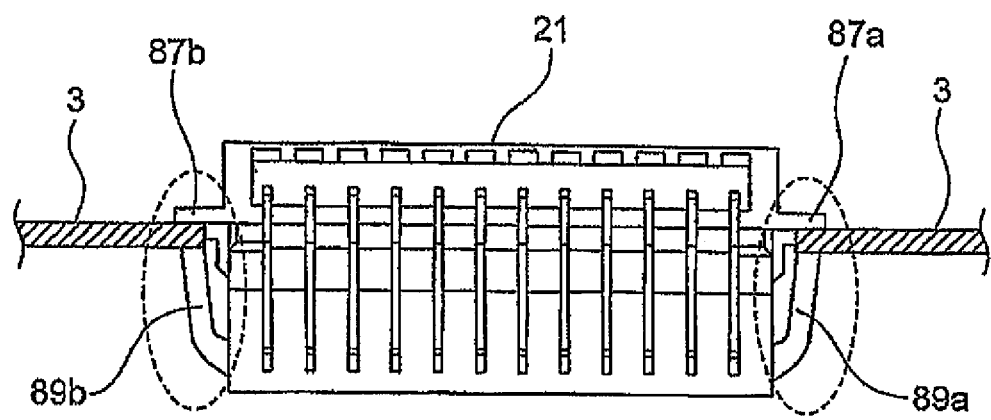
FIG. 17 is a diagram showing a process of assembling the backlight assembly 1.

Then, as shown in FIGS. 16 and 17, the relay connector 21 is fixed to the chassis 3.

Specifically, as shown in FIG. 16, the relay connector 21 (housing 61) is inserted from its lower surface 88 side into a hole 121 provided through the chassis 3 in a direction of white arrow in FIG. 16(b).

In this event, the inner periphery of the hole 121 and the elastic portions 89a and 89b of the housing 61 are brought into contact with each other, so that the elastic portions 89a and 89b are elastically deformed in the directions F1 and G1 in FIG. 13.

As the insertion further proceeds, as shown in FIGS. 16(c) and 17, the flange portions 87a and 87b of the housing 61 abut against the upper surface of the chassis 3.

Thereupon, since the inner periphery of the hole 121 rides over the elastic portions 89a and 89b of the housing 61, the elastic portions 89a and 89b get free of the inner periphery of the hole 121 to move in the directions F2 and G2 in FIG. 13, so that the free ends of the elastic portions 89a and 89b are brought into contact with the back surface of the chassis 3.

In this state, as shown in FIG. 17, since the flange portions 87a and 87b and the elastic portions 89a and 89b of the housing 61 sandwich the chassis 3 therebetween, the relay connector 21 is fixed to the chassis 3.

Then, the light-emitting element boards 23a to 23f and the relay connector 21 are connected to each other using the harness 25.

Specifically, first, as shown in FIG. 3(a) and FIG. 3(c), the light-emitting element connectors 33 of the light-emitting element boards 23a to 23f and the light-emitting element side connectors 43 of the harness 25 are connected to each other.

Figure 18:
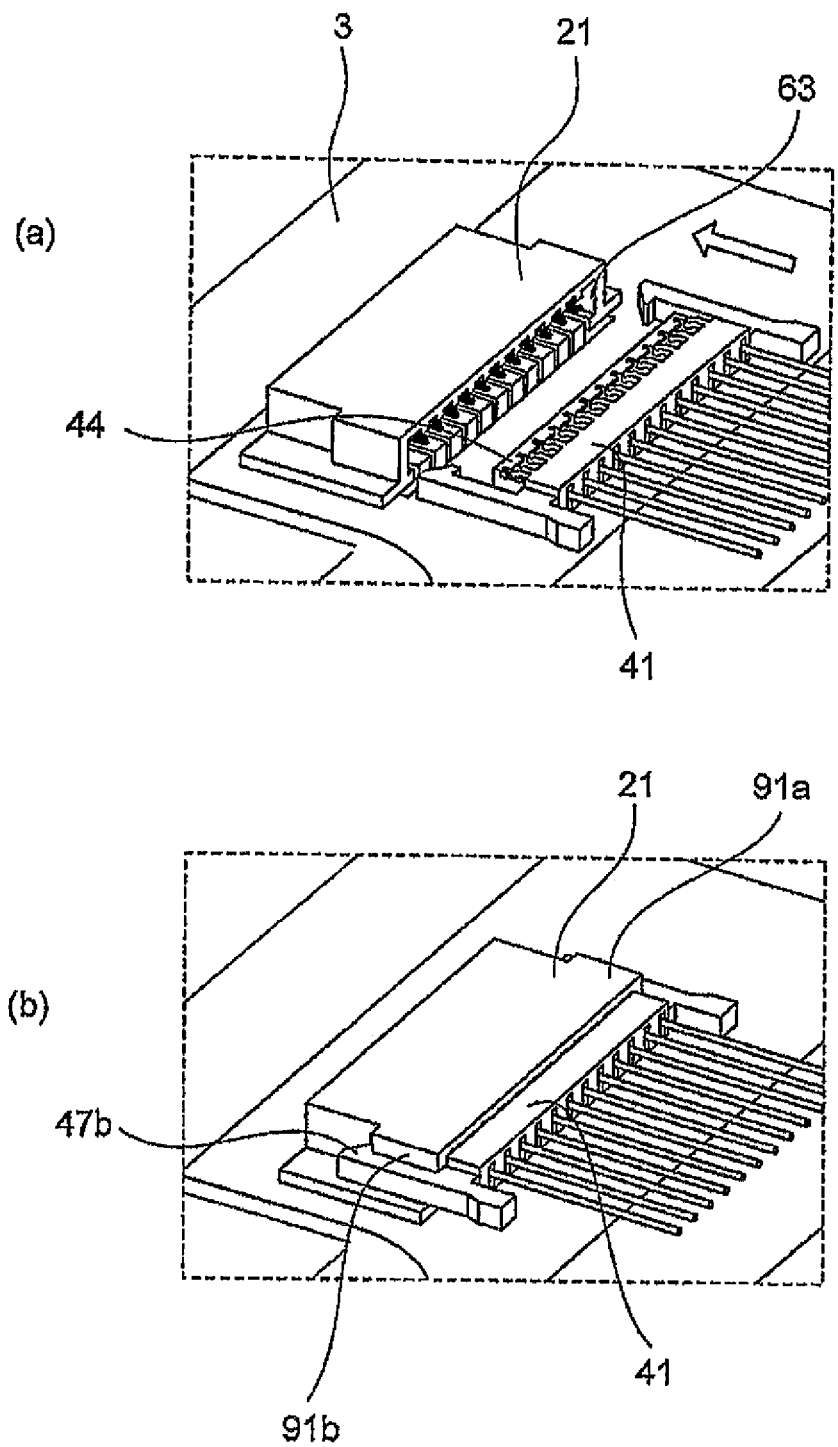
FIG. 18 is diagrams showing a process of assembling the backlight assembly 1.

After the light-emitting element connectors 33 and the light-emitting element side connectors 43 are connected to each other, as shown in FIG. 18, the insertion portion 44 of the harness connector 41 of the harness 25 and the harness insertion hole 63 of the relay connector 21 are faced each other and then the harness connector 41 is moved in a direction of white arrow in FIG. 18(a) to thereby insert the pin contacts 101 into the contact holes 46.

Thereupon, the pin contacts 101 and the harness-side contacts 46a are brought into contact with each other and thus are electrically connected together.

At the time of the insertion, the insertion is carried out using the concave portions 49 (see FIG. 10) of the harness connector 41 and the convex portions 97 (see FIG. 12) of the harness insertion hole 63 as guides to engage them together.

By carrying out the insertion in this manner, it is possible to prevent pinching at the time of the insertion, i.e. it is possible to prevent the pin contacts 101 from being pushed and bent by the insertion portion 44.

In this event, (the tapered portions of) the claw portions 47a and 47b are brought into contact with the locking portions 91a and 91b and the insertion proceeds so that the claw portions 47a and 47b ride over the locking portions 91a and 91b while the claw portions 47a and 47b are deformed to rotate in the directions of arrows D1 and E1 in FIGS. 10 and 11.

After the claw portions 47a and 47b ride over the locking portions 91a and 91b, the hook portions 45a and 45b rotate in the directions of arrows D2 and E2 in FIGS. 10 and 11 and return to the state before the deformation, so that the claw portions 47a and 47b engage with the locking portions 91a and 91b and, as shown in FIG. 18(b), the harness connector 41 and the relay connector 21 are engaged together.

As shown in FIGS. 2 and 3, the wire harnesses 40 of the harness 25 are disposed in a groove portion 3a provided on the chassis 3.

Finally, the power supply board 51 and the relay connector 21 are connected to each other.

Specifically, first, as shown in FIG. 19(a), the power supply board insertion hole 65 of the relay connector 21 and the board-side connecting portion 57 of the power supply board 51 are faced each other. Then, the power supply board 51 is moved in a direction of white arrow in FIG. 19(a) and, as shown in FIG. 19(b), the board-side connecting portion 57 is inserted into the power supply board insertion hole 65.

Thereupon, the elastic contacts 103 grasp the board-side connecting portion 57 and thus are brought into contact with the conductive patterns 58, so that they are electrically connected together. After the power supply board 51 and the relay connector 21 are connected together, finally, the power supply board 51 is fixed to the chassis using non-illustrated screws.

Through the processes described above, as shown in FIG. 20, the power supply board 51 and the harness 25 (light-emitting element boards 23a to 23f) are connected together through the relay connector 21.

As described above, according to the first embodiment, the backlight assembly 1 comprises the light-emitting element boards 23a to 23f that are provided on the upper surface (front surface) of the chassis 3, the power supply board 51 that is provided on the back surface of the chassis 3, the relay connector 21 that is held by the chassis 3 and electrically connects between the power supply board 51 and the light-emitting element boards 23a to 23f, and the harness 25 that connects between the light-emitting element boards 23a to 23f and the relay connector 21.

Therefore, the backlight assembly 1 does not require either a rubber plug or a power supply board connector. Since the number of components is reduced than conventional, a cost reduction is easy.

Further, since the backlight assembly 1 achieves the connection through the relay connector 21, the harness can be shortened and thus the cost of the harness can be suppressed as compared with the conventional structure in which the power supply board 51 and the light-emitting element boards 23a to 23f are electrically connected together using only the harness.

Further, the backlight assembly 1 does not require in assembly thereof the process of passing the harness through the hole of the chassis 3 and connecting the harness to the front and back boards (light-emitting element boards 23a to 23f and power supply board 51). Accordingly, it is possible to reduce the number of processes and thus to reduce the manufacturing cost.

Further, the backlight assembly 1 is configured such that, after the relay connector 21 is fixedly fitted to the chassis 3 from above, the harness is drawn around on the upper surface of the chassis 3 and the power supply board 51 is directly connected to the relay connector on the back surface of the chassis 3, i.e. such that each assembly process can be carried out on the same surface of the chassis 3, and therefore, the process of passing the harness through the hole of the chassis and connecting the harness to the respective boards on the front and back of the chassis is not required.

Consequently, the backlight assembly 1 can be suitably applied to the backlight unit 200 (liquid-crystal display device 100) which is assembled by stacking (laminating) the respective members. The workability in the assembly is improved and it is also possible to suppress the manufacturing cost of the backlight assembly 1 and the backlight unit 200.

Further, in the backlight assembly 1, it is not necessary to mount a connector on the power supply board 51. Consequently, the degree of freedom of design of the power supply board 51 is increased as compared with the conventional structure in which the connectors are mounted on the power supply board 51, and thus it is easy to achieve a cost reduction of the power supply board 51.

Next, a second embodiment will be described with reference to FIGS. 24 to 30.

The second embodiment is configured such that, in the first embodiment, a relay connector 21a and light-emitting element boards 149a and 149b are directly connected to each other using elastic contacts.

In the second embodiment, the same numerals are assigned to elements having the same functions as those in the first embodiment and a description will be given mainly of portions that are different from the first embodiment.

First, a schematic structure of a backlight assembly 1a will be described with reference to FIG. 24.

Figure 24:
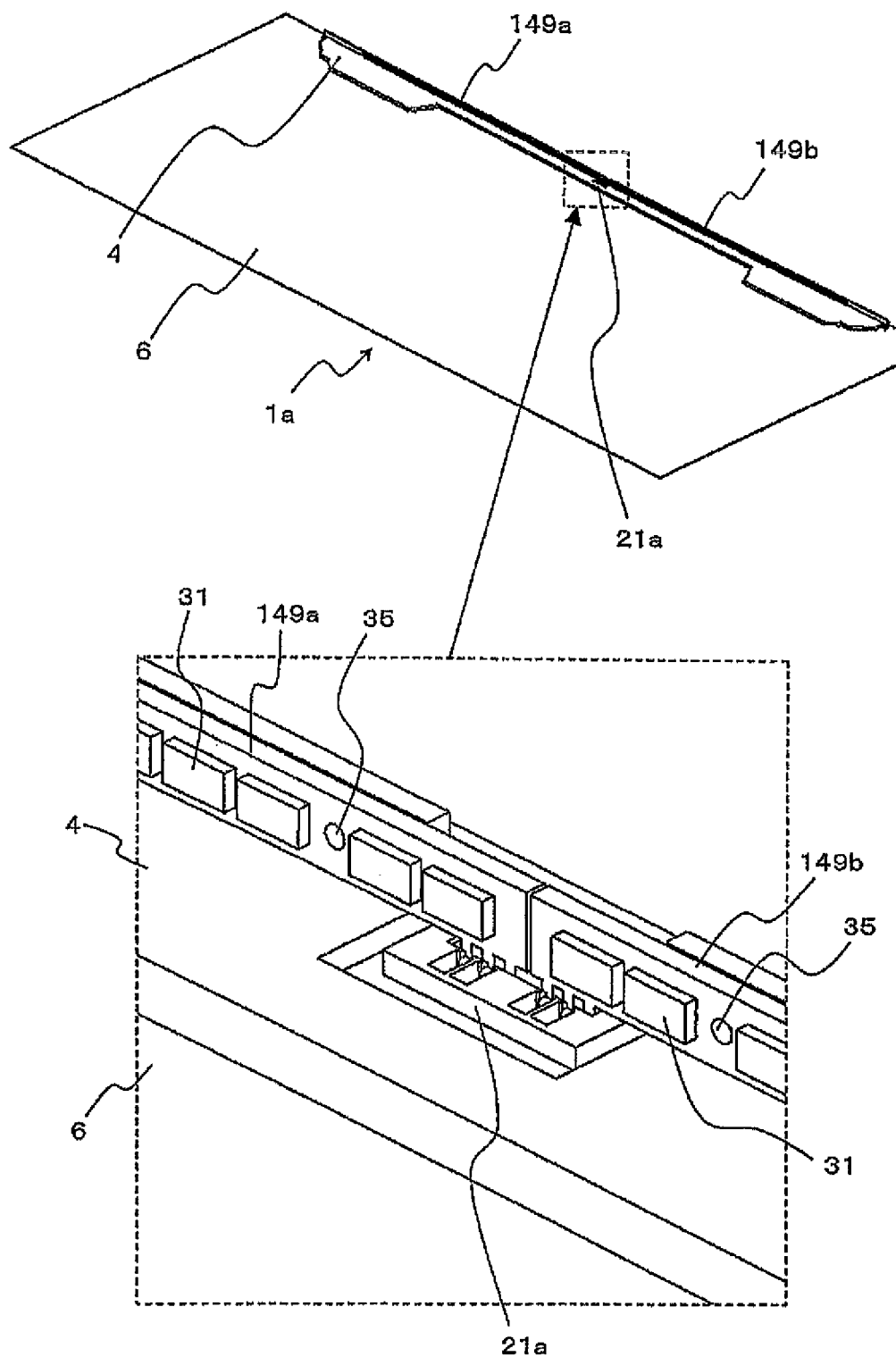

As shown in FIG. 24, the backlight assembly 1a comprises an L-shaped heat dissipating portion 4 provided along one side of a chassis 6 and light-emitting element boards 149a and 149b are fixed to an inner upright surface (a surface provided perpendicular to the chassis 6) of the heat dissipating portion 4.

FIG. 24 shows the case where the light-emitting element boards 149a and 149b are provided along only one side of the chassis 6. However, this embodiment is not necessarily limited to the case where the light-emitting element boards are provided only along one side, and the light-emitting element boards may be provided along a plurality of sides.

A relay connector 21a is provided at a position, just below a facing portion between the light-emitting element boards 149a and 149b, on the chassis 6, and the light-emitting element boards 149a and 149b and the relay connector 21a are directly connected to each other.

Next, referring to FIGS. 25 to 28, the structures of the light-emitting element boards 149a and 149b and the relay connector 21a will be described in detail.

First, the structure of the light-emitting element boards 149a and 149b will be described with reference to FIG. 25.

Figure 25:
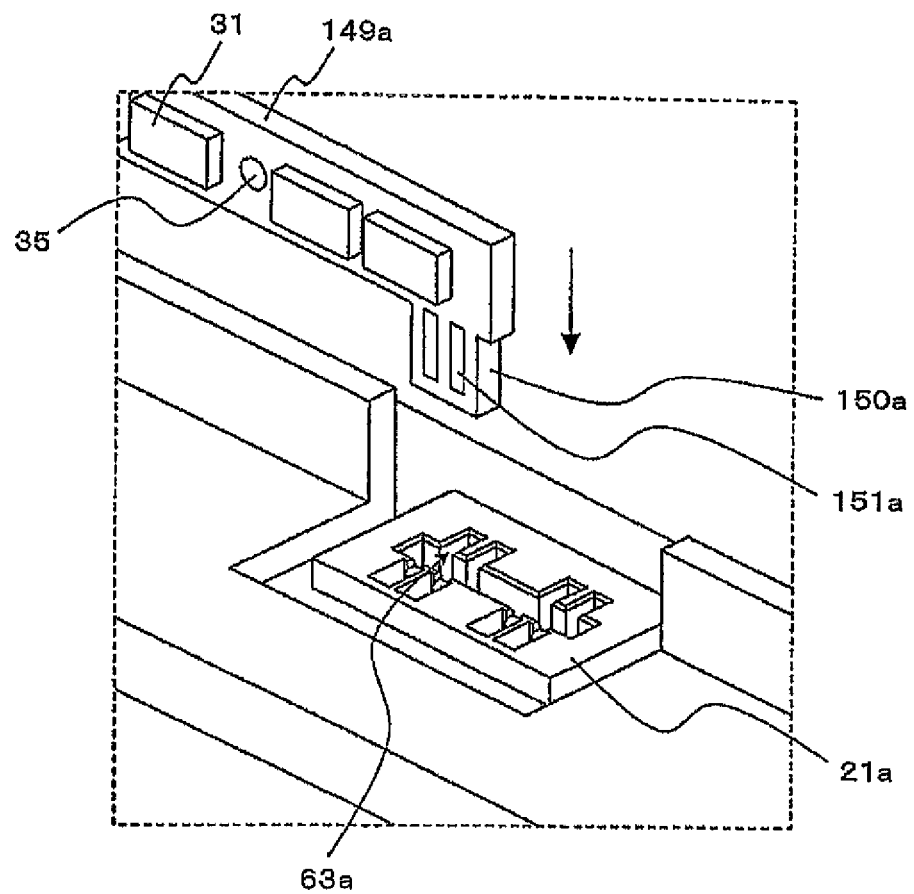
FIG. 25 is an exploded view of FIG. 24.

As shown in FIG. 25, the light-emitting element boards 149a and 149b (149b is not illustrated) comprise, as electrically conductive paths, board-like connecting portions 150a and 150b (150b is not illustrated) respectively protruding from lower surfaces near end faces facing each other.

The board-like connecting portions 150a and 150b are each a member forming a part of the outer periphery of the light-emitting element board 149a, 149b and having a surface formed with conductive patterns 151a, 151b (151b is not illustrated) which are to be brought into contact with contacts 69a (described later) of the relay connector 21a.

Next, the structure of the relay connector 21a will be described with reference to FIGS. 26 to 28.

Figure 26:
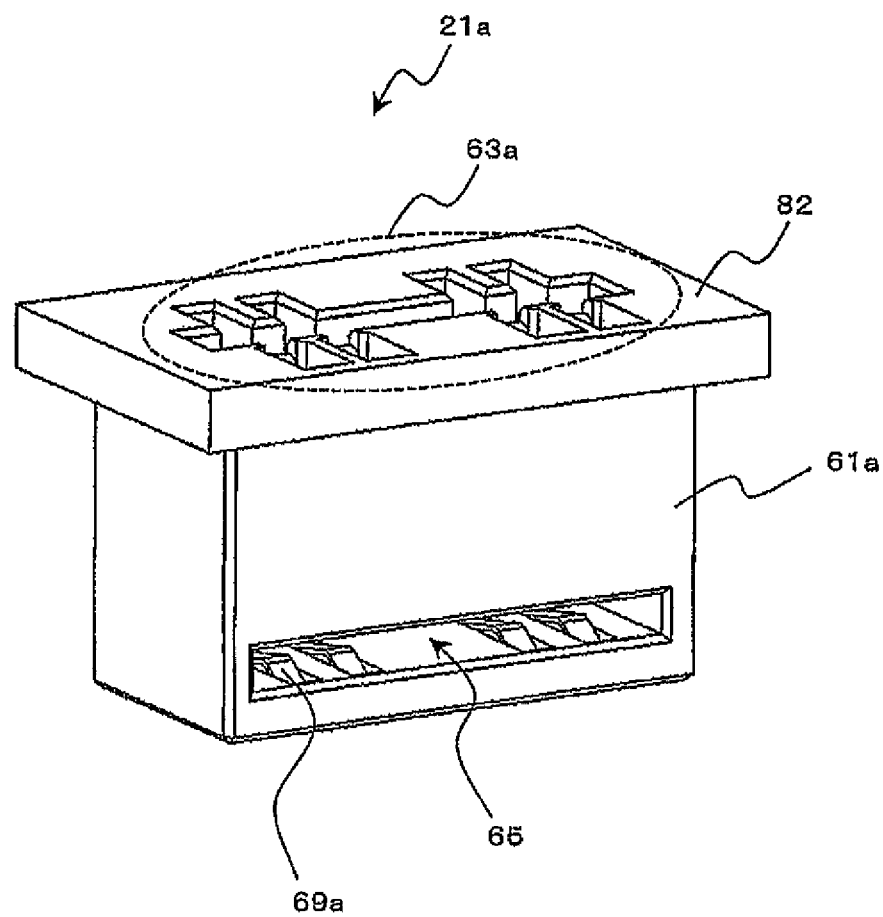

As shown in FIG. 26, the relay connector 21a comprises a housing 61a and the contacts 69a provided in the housing 61a.

Figure 27:
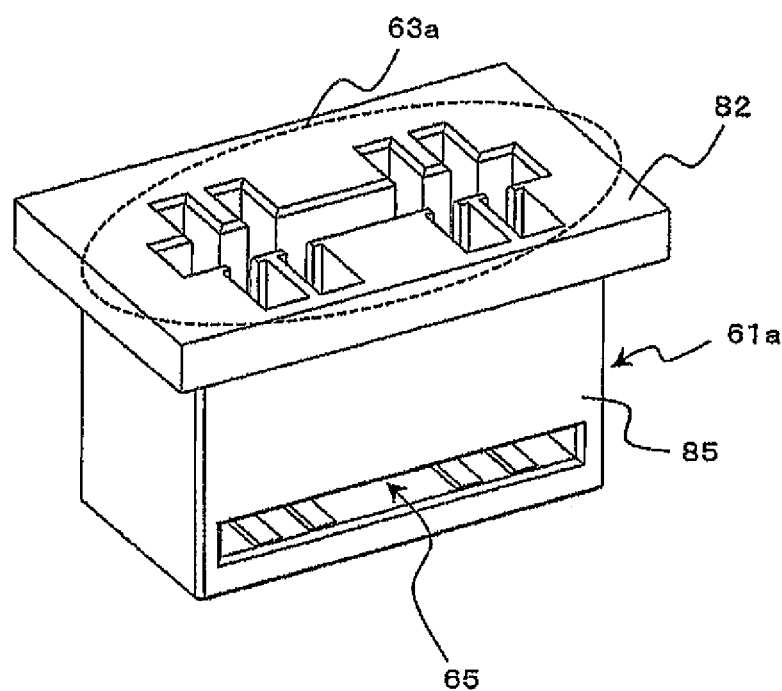

As shown in FIGS. 26 and 27, an upper surface 82 of the housing 61a is provided with an insertion hole 63a into which the board-like connecting portions 150a and 150b of the light-emitting element boards 149a and 149b are to be inserted.

As in the first embodiment, a power supply board insertion hole 65 is provided at a lower end of a back surface 85 of the housing 61a.

As is different from the first embodiment, the housing 61a is formed with no elastic portion and, as will be described later, the housing 61a is held by the light-emitting element boards 149a and 149b.

Figure 28:
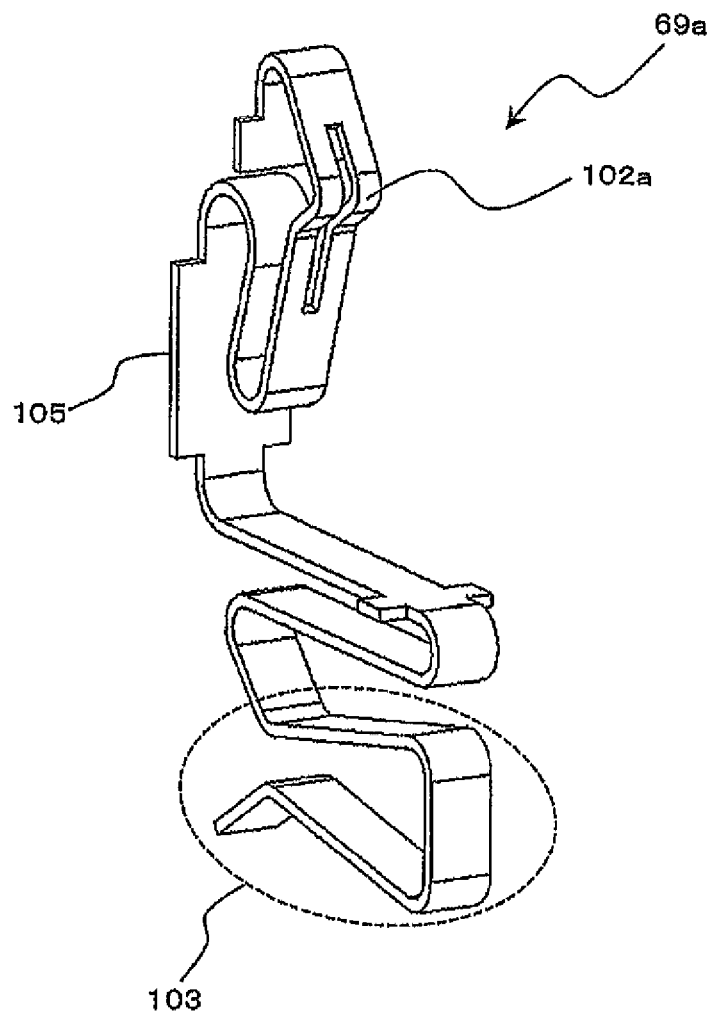

On the other hand, as shown in FIG. 28, each of the contacts 69a provided in the relay connector 21a comprises an elastic contact 102a comprising one end disposed in the insertion hole 63a.

However, as is different from an elastic contact 103, the elastic contact 102a is configured not to fix the board by grasping it, but to fix the board (light-emitting element board 149a, 149b) by elastically contacting the board to press it to a side surface of the insertion hole 63a.

Next, the sequence of assembly of the backlight assembly 1a will be described with reference to FIGS. 24 to 30.

First, the housing 61a and the contacts 69a are assembled into the relay connector 21a.

Figure 29:
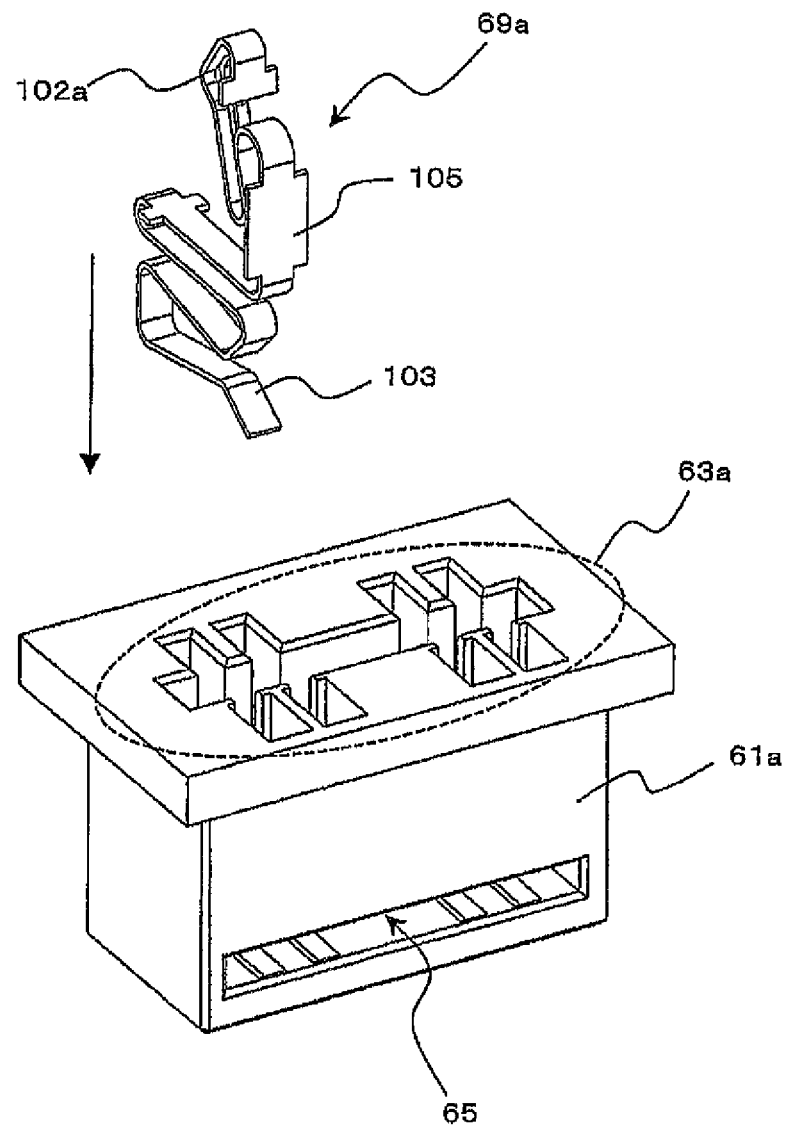

Specifically, as shown in FIG. 29, each contact 69a is inserted into the insertion hole 63a from the elastic contact 103 side and is fixed to the inside of the housing 61a by a press-fitting portion 105. In this event, the contact 69a is disposed so that the elastic contact 103 is provided in the power supply board insertion hole 65 while the elastic contact 102a is provided in the insertion hole 63a.

Figure 30:
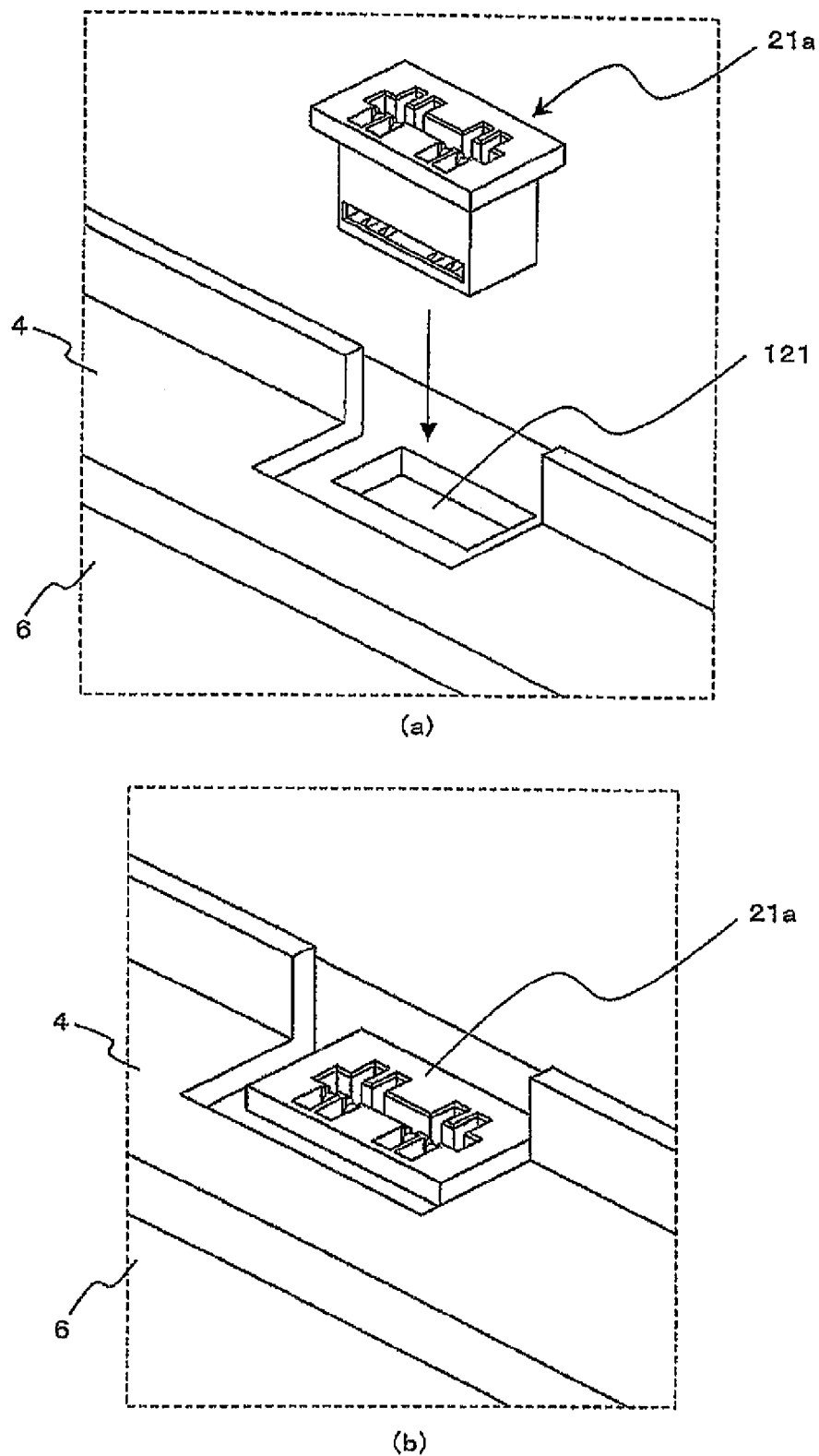
FIG. 30 is perspective views showing a process of attaching the relay connector 21a to a chassis 6.

Then, as shown in FIG. 30, the relay connector 21a is inserted into a hole 121 of the chassis 6 (see FIG. 17).

Then, as shown in FIG. 25, the board-like connecting portions 150a and 150b (150b is not illustrated) of the light-emitting element boards 149a and 149b (149b is not illustrated) are inserted into the insertion hole 63a to bring the conductive patterns 151a and 151b (151b is not illustrated) into contact with the elastic contacts 102a, so that the light-emitting element boards 149a and 149b and the relay connector 21a are electrically connected together.

In this manner, the electrically conductive path is not necessarily the harness connector and may be the board-like connecting portion directly connecting the light-emitting element board 149*a*, 149*b*.

After the light-emitting element boards 149*a* and 149*b* and the elastic contacts 102*a* are connected to each other, the light-emitting element boards 149*a* and 149*b* are fixed to the heat dissipating portion 4 by inserting non-illustrated screws or the like into holes 35 of the light-emitting element boards 149*a* and 149*b*. Consequently, the light-emitting element boards 149*a* and 149*b* are fixed to the chassis 6 and the relay connector 21*a* is held to the chassis 6 by the light-emitting element boards 149*a* and 149*b*. That is, since the relay connector 21*a* is connected to the light-emitting element boards 149*a* and 149*b* and the light-emitting element boards 149*a* and 149*b* are fixed to the heat dissipating portion 4, the movement of the relay connector 21*a* is inhibited by the light-emitting element boards 149*a* and 149*b* (and the chassis) and thus the relay connector 21*a* is fixed.

In this manner, the relay connector 21*a* may be fixed to the chassis 6 through the light-emitting element boards 149*a* and 149*b*, i.e. not being directly fixed to the chassis 6 using flanges and elastic portions.

Figure 19:
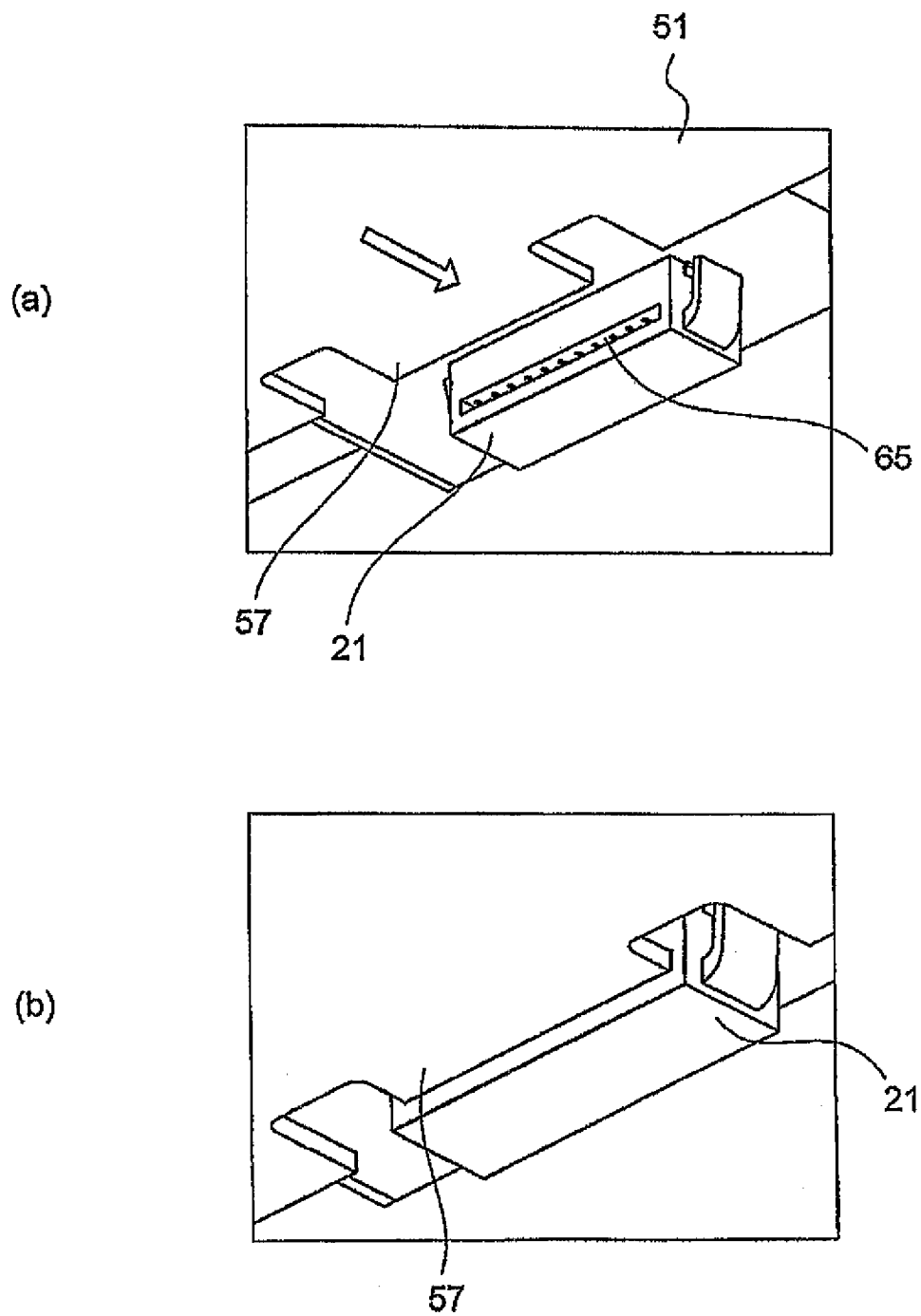
FIG. 19 is diagrams showing a process of assembling the backlight assembly 1.

Finally, as in the first embodiment, the power supply board 51 and the relay connector 21*a* are connected to each other (see FIG. 19).

Through the sequence described above, the backlight assembly 1*a* is assembled.

As described above, according to the second embodiment, the backlight assembly la comprises the light-emitting element boards 149*a* and 149*b* that are provided on the upper surface of the chassis 6, the power supply board 51 that is provided on the back surface of the chassis 6, and the relay connector 21*a* that is held by the chassis 6 and electrically connects between the power supply board 51 and the light-emitting element boards 149*a* and 149*b*.

Accordingly, the same effect is obtained as in the first embodiment.

INDUSTRIAL APPLICABILITY

In the above-mentioned embodiments, the description has been given of the case where this invention is applied to the backlight assembly 1, 1*a* of the liquid-crystal display device 100 mounted with LEDs. However, this invention is by no means limited thereto and is applicable to various structures that require a backlight assembly.

In the first embodiment, the harness insertion hole 63 and the power supply board insertion hole 65 are provided on the opposite surfaces of the housing 61, but they may be provided on the same surface. Further, as in the second embodiment, the harness insertion hole 63 may be provided on the upper surface 82 of the housing 61.

Further, in the first embodiment, the relay connector 21 is fixed to the chassis 3, but it may be fixed not to the chassis 3 but to another member such as a heat dissipating plate (heat sink).

In the second embodiment, the heat connector 21*a* is fixed using the light-emitting element boards 149*a* and 149*b*, but, as in the first embodiment, it may be fixed using elastic portions and flange portions. In this case, the member to which it is fixed may be the chassis 6 or a member other than the chassis 6, such as the heat dissipating portion 4.

DESCRIPTION OF SYMBOLS

1 backlight assembly
3 chassis
21 relay connector
23*a* light-emitting element board
23*b* light-emitting element board
23*c* light-emitting element board
23*d* light-emitting element board
23*e* light-emitting element board
23*f* light-emitting element board
25 harness
31 light-emitting element
33 light-emitting element connector
40 wire harness
41 harness connector
42 housing
43 light-emitting element side connector
44 insertion portion
45*a* hook portion
45*b* hook portion
51 power supply board
53 connecting portion
57 board-side connecting portion
61 housing
63 harness insertion hole
65 power supply board insertion hole
67 contact insertion hole
67*a* protruding portion press-fitting hole
69 contact
81 housing body
87*a* flange portion
87*b* flange portion
89*a* elastic portion
89*b* elastic portion
91*a* locking portion
91*b* locking portion
100 liquid-crystal display device
101 pin contact
103 elastic contact
105 press-fitting portion
200 backlight unit
300 liquid-crystal display portion

The invention claimed is:

1. A backlight assembly comprising
a light-emitting element board that is mounted with a light-emitting element and disposed at a peripheral portion of a front surface of a chassis,
a power supply board that is disposed on a back surface of the chassis and supplies power to the light-emitting element board, and
a relay connector that is held by the chassis and connects between the power supply board and the light-emitting element board,
wherein the relay connector comprises
a housing that is provided passing through the chassis, and
a contact that is held by the housing and electrically connects between the power supply board and the light-emitting element board.

2. The backlight assembly according to claim 1, wherein the contact comprises
a power supply board connecting portion that is connected to the power supply board,
an electrically conductive path connecting portion that is connected to an electrically conductive path connected to the light-emitting element board, and
a press-fitting portion that is provided between the power supply board connecting portion and the electrically conductive path connecting portion and is press-fitted into the housing.

3. The backlight assembly according to claim 2, wherein the electrically conductive path comprises a wire harness comprising one end provided with a harness connector.

4. The backlight assembly according to claim 2, wherein the electrically conductive path is a board-like connecting portion forming a part of an outer periphery of the light-emitting element board, and
the electrically conductive path connecting portion is an elastic contact that is in elastic contact with the board-like connecting portion.

5. The backlight assembly according to claim 2, wherein the electrically conductive path connecting portion is a pin contact.

6. The backlight assembly according to claim 2, wherein the power supply board connecting portion is an elastic contact that is in elastic contact with the power supply board.

7. The backlight assembly according to claim 1, wherein the housing comprises
a flange, and
an elastic portion that sandwiches the chassis jointly with the flange.

8. A relay connector wherein
the relay connector is held by a chassis comprising a front surface on which a light-emitting element board mounted with a light-emitting element is disposed at a peripheral portion thereof, and a back surface on which a power supply board that supplies power to the light-emitting element board is disposed, and
the relay connector comprises
a housing that is provided passing through the chassis, and
a contact that is held by the housing and electrically connects between the power supply board and the light-emitting element board.

9. The relay connector according to claim 8, wherein the contact comprises
a power supply board connecting portion that is connected to the power supply board,
an electrically conductive path connecting portion that is connected to an electrically conductive path connected to the light-emitting element board, and
a press-fitting portion that is provided between the power supply board connecting portion and the electrically conductive path connecting portion and is press-fitted into the housing.

10. The relay connector according to claim 9, wherein the electrically conductive path connecting portion is a pin contact.

11. The relay connector according to claim 9, wherein the power supply board connecting portion is an elastic contact that is in elastic contact with the power supply board.

12. The relay connector according to claim 8, wherein the housing comprises
a flange, and
an elastic portion that sandwiches the chassis jointly with the flange.

13. A backlight unit comprising the backlight assembly according to claim 1.

* * * * *